US012679064B2

(12) United States Patent
Macor

(10) Patent No.: US 12,679,064 B2
(45) Date of Patent: Jul. 14, 2026

(54) METHOD, MACHINERY, DECORATIVE FILM AND EMBOSSABLE FORMULATION TO DECORATE AND EMBOSS A MATERIAL

(71) Applicant: Giorgio Macor, Villorba (IT)

(72) Inventor: Giorgio Macor, Villorba (IT)

( * ) Notice: Subject to any disclaimer, the term of this patent is extended or adjusted under 35 U.S.C. 154(b) by 0 days.

(21) Appl. No.: 18/670,487

(22) Filed: May 21, 2024

(65) Prior Publication Data

US 2025/0010572 A1 Jan. 9, 2025

(30) Foreign Application Priority Data

| | | |
|---|---|---|
| May 22, 2023 | (IT) | 102023000010356 |
| Jun. 1, 2023 | (IT) | 102023000011286 |
| Jun. 12, 2023 | (IT) | 102023000011994 |
| Oct. 23, 2023 | (IT) | 102023000022128 |
| Oct. 30, 2023 | (IT) | 102023000022734 |
| Mar. 4, 2024 | (IT) | 102024000004729 |

(51) Int. Cl.

| | |
|---|---|
| ***B32B 3/30*** | (2006.01) |
| ***B32B 7/12*** | (2006.01) |
| ***B32B 27/06*** | (2006.01) |
| ***B32B 27/30*** | (2006.01) |
| ***B32B 37/24*** | (2006.01) |
| ***B32B 38/00*** | (2006.01) |
| ***B32B 38/06*** | (2006.01) |

(52) U.S. Cl.

CPC .................. *B32B 3/30* (2013.01); *B32B 7/12* (2013.01); *B32B 27/06* (2013.01); *B32B 27/304* (2013.01); *B32B 37/24* (2013.01); *B32B 38/06* (2013.01); *B32B 38/145* (2013.01); *B32B 2037/243* (2013.01); *B32B 2255/10* (2013.01); *B32B 2255/12* (2013.01); *B32B 2255/26* (2013.01); *B32B 2255/28* (2013.01); *B32B 2307/4023* (2013.01); *B32B 2307/584* (2013.01)

(58) Field of Classification Search

CPC ......... B32B 3/30; B32B 38/06; B41M 5/0047

See application file for complete search history.

(56) References Cited

U.S. PATENT DOCUMENTS

| | | | | |
|---|---|---|---|---|
| 2010/0086742 A1* | 4/2010 | Abe | B44C 5/0476 427/256 |
| 2018/0319148 A1 | 11/2018 | Pervan | |
| 2020/0189250 A1 | 6/2020 | Lenaerts | |
| 2020/0262219 A1* | 8/2020 | Vachhani | B41J 3/407 |
| 2023/0302846 A1* | 9/2023 | Macor | B05D 5/02 |
| 2024/0116307 A1* | 4/2024 | Macor | B44C 1/10 |

FOREIGN PATENT DOCUMENTS

| | | |
|---|---|---|
| EP | 3095613 B2 | 11/2016 |
| WO | 2008152137 A2 | 12/2008 |
| WO | 2017017473 A1 | 2/2017 |
| WO | 2018069874 A1 | 4/2018 |
| WO | 2020039361 A1 | 2/2020 |
| WO | 2022034546 A1 | 2/2022 |

* cited by examiner

*Primary Examiner* — Elizabeth E Mulvaney
(74) *Attorney, Agent, or Firm* — Maschoff Brennan

(57) ABSTRACT

The method object of the invention involves printing an image on a flexible film, applying an embossable formulation, consisting of a photo-crosslinkable formulation containing at least one thermoplastic resin, on it, laminating the printed and coated film with the embossable formulation to the substrate to be decorated, embossing the substrate on which the printed and coated film with the embossable formulation has been previously applied.

32 Claims, 7 Drawing Sheets

10.1 10.2 10.3

METHOD, MACHINERY, DECORATIVE FILM AND EMBOSSABLE FORMULATION TO DECORATE AND EMBOSS A MATERIAL

FIELD OF INVENTION

The present invention relates to a method for making a decorated and textured substrate, the decorative film, the embossable formulation and the machinery for making the ready-to-laminate film.

In particular, the invention concerns a substrate decorated and textured by digital printing, the film ready-to-laminate, the various layers to protect it and a method for making it.

The present invention fits into the technical sector of materials and to create panels to produce floors, coverings, furniture and more generally for architectural and design surfaces.

The present invention exploits the combination of traditional technologies, which offer high mechanical, chemical-physical properties, low costs and the versatility of digital technologies which allow total customization and high precision.

STATE-OF-THE-ART

The panels to produce flooring and furniture which reproduce wood and other natural materials in color and feel are generally made of wood-derived substrates such as HDF, MDF and chipboard or synthetic substrates such as polyester, PVC (SPC, LVT, WPC) and polyolefins such as PE and PP.

The state of the art for traditional floors made of wood and derivatives (MDF/HDF/chipboard/plywood), involves the use of (printed) decorative paper applied to the substrate and normally protected by the application of amino-plastic resins. The process takes place in continuous or discontinuous presses through the application of pressure and heat. The surface obtained is extremely resistant to scratches and abrasion. The product thus obtained is commonly called laminate. Alternatively, especially for furniture, decorative papers can be used, called "finish paper" which is normally applied cold with the aid of adhesives. Finish paper is made of decorative paper+protection and it's normally embossed.

Similarly, plastic films are normally used to decorate synthetic substrates and are laminated with or without the use of adhesives. The lamination of the decorated film on the surface of the substrate to be decorated can take place continuously by means of for example calenders, double belt presses, or discontinuously by means of flat presses or membrane presses. Pressure, temperature and lamination time depend on the materials to be laminated. For example, in the case of PVC-based materials, calender lamination it's a continuous process and takes place at 170-200° C. for a few seconds while press lamination takes place at 120-160° C. for several minutes with subsequent cooling to stabilize the material. Lamination normally occurs following the extrusion phase of the substrate to be decorated. Typically, in the case of PVC, the material comes out of the extruder (FIG. 7.1) at a speed of 1-5 m/min with a temperature around 140-200° C. The material passes 1 or more pairs of calenders (FIG. 7.3) to reach the desired width and to make the surface flat.

Normally, during or after the lamination phase (FIG. 7.4, FIG. 7.5), an embossing element (FIG. 7.6) is used to create the structure of the material to be reproduced, such as stone and wood. These embossing elements are generally made of metal and the textures are created through mechanical and/or chemical and/or laser processing. Similarly to the finish paper, for plastic substrates are available in the market finished films (e.g. ex-Profol DE or ex-Renolit DE). These finished films are made of decorated plastic film+protection layer+finishing layer (topcoat) and they are generally embossed. The finished films might have on the lamination side an adhesive and they are applied by means of heat and pressure or cold with the aid of specific adhesives.

Recently, PVC flooring is experiencing a renaissance with the introduction of the so-called LVT (Luxury Vinyl Tile) and SPC (Stone Plastic Composite), where the product is presented as a plank suitable for floating or self-adhesive installation and characterized by low thickness (3-5 mm), useful in renovations. Since LVT/SPC is a design product, the market would welcome the use of digital technologies for printing, allowing just-in-time production and the proposal of fast creations, typical of fashion.

Traditional technology involves the lamination of the substrate (core, FIG. 7.2), decorative film (FIG. 7.4) and protective film (commonly called Wear Layer, FIG. 7.5) without the use of adhesives. Normally during the lamination phase an embossed element is used to create the structure of the material to be reproduced, such as stone and wood.

To guarantee adhesion between the transparent protective layer and the decorative film, the ink should have thermoplastic behavior and in fact the gravure inks normally used are mainly solvent-based and generally contain solubilized or dispersed PVC to enhance adhesion with the protective layer (wear layer).

The protective layer or wear layer is made up of a thick film (300-500μ) of transparent polymer (PVC, PP, PET) and is applied by means of heat and pressure in continuous presses, discontinuous presses, engraved cylinders. The surface is then generally finished by applying a photo-cross-linkable coating (topcoat) to obtain the desired gloss and impart resistance to scratches, chemical resistance and stains.

Recently, to meet environmental criteria, the industry is trying to use water-based inks which, however, having no affinity with thermoplastic films and often offer inadequate print quality. The evaporation of water also requires the use of heat which makes its application on plastic films critical which are notoriously thermosensitive, causing stretching and distortion.

Digital printing and in particular inkjet printing is increasingly establishing itself in industrial sectors, replacing traditional methods based on analogue printing. The advantages of digital printing are considerable and include high flexibility, the possibility of producing small runs and the reduction of consumable waste.

In particular, the reproduction of wood on various materials represents a typical application of digital printing to produce floors, furniture panels, skirting boards, profiles and in general in the field of design and architecture.

Using digital printing for SPC and in general for laminated substrates would be a preferred option but the commonly used photocurable inkjet inks aren't thermoplastic and the wear layer wouldn't adhere on the printed inks causing delamination. To overcome this issue, the use of coatings and more specifically photocurable coatings to replace the wear layer and protect the decorated film is envisaging. The decorative film could be then coated with the photocurable coating and subsequently laminated to the core in a completely similar way to the current process. On the other side, to achieve the desired abrasion resistance the photocurable coating should be applied in large amount (100-200 g/sqm, approx. 75-150 microns) and it should contain anti-abrasive filler such as Aluminum Oxide. Unfortunately, the thickness and the filler would make the photocurable coating rigid which would easily crack after application on the film and subsequent curing. Moreover, because the standard photo-curable coatings are scarcely thermoplastic, relaxation of the embossed coating with texture loss is quite common and it's accelerated by temperature increase.

To overcome the mentioned limitations, various technologies have been proposed for the digital decoration of LVT floors, for example patent US20180319148A1 involves the use of a water-based ink and subsequent lamination.

Patent EP3095613B2 involves the use of a water-based ink containing a polyurethane resin and subsequent lamination.

Patent US20200189250A1 involves the use of a photo-crosslinkable ink to which an adhesive layer is applied and subsequent lamination.

Patent WO2017017473A1 involves the use of a photo-crosslinkable ink in which a vinyl resin is dissolved.

Application WO2008152137A2 involves printing on thermoplastic films, protecting the print with a photo-cross-linkable coating, laminating the decorated and coated film to a substrate to decorate, optionally embossing it.

The technologies mentioned above, although providing a solution for the digital decoration with subsequent lamination, do not overcome all the problems, and particularly the abrasion performance, the texturability while keeping minimal substrate distortion.

Alternatively to lamination, industrial digital printing technology for direct substrate decoration (direct-to-board) has been developed. In the direct-to-board technology all layers (primer, white, printing, protecting, and finishing layer) are applied directly to the substrate without using decorated paper or decorated film. The decoration is protected with a photocurable coating which contains anti-abrasive filler such as Aluminum Oxide. The photocurable coating, depending on the desired abrasion class is applied in 100-200 g/sqm. After polymerization, the photo-cross-linkable coating shows shrinkage of around 8-15% by volume, causing deformation of the substrate (defined as bending/cupping/curling). This phenomenon is strongly accentuated in the case of plastic flooring and even more so when the material is tested, as per standards, for dimensional stability for 6 hours at 80° C.

Several technologies have been developed combining digital printing and at the same time protecting the underlying decoration from abrasion and presenting high flexibility to avoid deformation of the substrate. As an example, application WO2022034546A1 provides for the use of photo-crosslinkable resins containing thermoplastic resins with direct-to-board application but not for application on film and subsequent lamination.

Despite direct-to-board seems to be the best technology for architectural material decoration, it has disadvantages which are difficult to overcome such as high CAPEX, large footprint (a direct-to-board line is typically 120-150 m long) and specific know how is needed to run it.

In addition to the technologies mentioned previously, to create three-dimensional surface structures, photo-crosslinkable formulations might be used which are embossed by applying and simultaneously irradiating engraved elements transparent to UV light, for example using embossing films/papers (e.g. Ultracast ex-SAPPI). Another technology involves the use of hot-melt formulations which are applied to the surface to be protected and are subsequently embossed with embossing elements. An example of this technology is HotCoating by Kleiberit (DE) which however has limitations as the hot-melt is of a polyurethane nature which takes 48-96 hours to crosslink on wood derivatives and over 10 days on synthetic materials that do not contain residual humidity; therefore decorated panels require a long time before they can be mechanically processed.

Since state-of-the-art SPC/LVT process is lamination, it would be welcome to develop a technology capable of combining digital printing with standard lamination while meeting the desired characteristics of abrasion resistance, scratches and other properties listed as those indicated in the EN 15468:2016 and/or EN 16511:2019 standards. In addition, the method should be able to involve traditional embossing technologies as well as digital texturing technologies, such as, those described in WO2018069874A1 and WO2020039361A1.

In the following GLOSSARY the technical meanings of the terms used in this description and in the claims are better defined:

TEXTURING/EMBOSSING/EMBOSSING: creation of a three-dimensional structure that can be both positive, negative or combination of negative and positive.

READY-TO-LAMINATE FILM: is the film object of the invention which is constituted by a flexible film, a printed image (decoration) or a uniform color, an embossable formulation, an optional finishing layer (topcoat).

EMBOSSABLE FORMULATION: shaping of the layer formed by the said formulation in such a way that the surface presents a three-dimensional pattern, i.e. alternating depressions and/or protrusions.

EMBOSSING ELEMENT: system capable of generating, through pressure and/or heat, a permanent imprint of a relief design. The element can for example consist of a calender, a press plate, a double belt press, a membrane press.

POLYMERIZATION: reaction whereby multiple molecules of the same compound, generally organic and with a low molecular weight (monomer), join to form a multiple molecule (polymer) with a higher molecular weight. It can occur by addition (see polyaddition), when it occurs simply by the sum of the molecules of the monomer to form a polymer whose centesimal composition is therefore the same and the molecular weight is a multiple of that of the monomer; or by condensation (see polycondensation), when the union between the molecules of the monomer is accompanied by the elimination of simple molecules (water, hydracids, etc.), for which the molecular weight of the resulting polymer is not exactly a multiple of that of the monomer nor is the centesimal composition exactly the same. When there is the union of monomers of different species it is more properly called copolymerization. In the case of photopolymerization, the reaction can occur by irradiation with UV rays, normally accelerated by the presence of photoinitiators.

PHOTOINITIATOR: compound which, following exposure to ultraviolet light, releases substances that activate the polymerization reactions of photo-crosslinkable coatings.

DRYING: removal of the solvent in the case of solvent-based coatings or of the dispersing vehicle in the case of dispersed resin-based coatings.

BENDING/CURLING/CUPPING: deformation of a substrate resulting from the application of other layers on it such as coatings, inks, adhesives, plastic films. Normally the deformation is accentuated by heat.

PAINT/COATING/LACQUER: product intended to protect and/or decorate and/or improve the aesthetics of a substrate.

PHOTOCURING/RADIATION-CURING/ENERGY-CURING: crosslinking reaction in the presence or absence of photoinitiators, induced by irradiation using energetic radiation such as but not limited to, UV Hg bulb UV LED lamps, electron beam.

GLOSS/BRILLIANCE of a material defines whether the final surface is opaque or shiny. The unit of measurement is an index called Gloss Units (abbreviated GU), or simply Gloss which ranges from 0 to 100%. The measuring instrument is the reflectometer or glossmeter, which measures the specular reflection, i.e. the intensity of the light reflected, within a small area, on the angle of reflection. More details on gloss measurement are contained in the ISO 2813 standard.

Tg: the glass transition temperature of a polymer is the temperature region of the transition from a rigid "glassy" state to a flexible "rubbery" state.

CENTRAL DRUM: element on which the printing and/or coating operations are carried out.

HYPERSPECTRAL CAMERA: a hyperspectral camera can acquire an image and, for each pixel, the relative spectrum simultaneously, generating what is commonly called a "data cube", thus combining Imaging and Spectroscopy. The "data cube" consists of a series of frames, each of which is an image line that is wavelength-dispersed and acquired by the sensor. It is therefore the spectral information line by line that is acquired by the sensor, while the spatial information will be reconstructed via software starting from the spectral information.

SOLID COLOR: is a uniform monochromic color and it can be made by using specific pigment (e.g. green or brown), by mixing two or more colors (e.g. mixing two colored formulations) by overlapping two or more colors (usually overlap of transparent colored layers already dried).

DUAL-CURE: ability of a formulation to undergo two or more different ways of cross-linking, such as:
- Radicalic photocrosslinking.
- Cationic photocrosslinking.
- Thermal cross-linking with reaction of various species better identified in the following pages.
- Acid photo-generation.
- Base photo-generation.

SUMMARY OF THE INVENTION

The method of the invention overcomes the limitation of direct-to-board technology allowing the use of traditional lamination lines with digitally printed film.

The method object of the invention involves printing an image on a flexible film, applying an embossable formulation, consisting of a photo-crosslinkable formulation containing at least one thermoplastic resin, on it, laminating the decorated and coated film with the embossable formulation to the substrate to be decorated, embossing the substrate on which the decorated and coated film with the embossable formulation has been previously applied.

The method object of the invention involves the use of hybrid systems with thermoplastic properties and the use of photo-crosslinkable resins in combination with non-photo-crosslinkable thermoplastic resins is particularly effective. These hybrid systems can also be used as base of one or more layers making up the decoration cycle, such as: adhesion primer, white base, ink, printing primer, finish. Non limitative examples of the formulations of such hybrid systems may be the ones described in WO2022034546A1.

In accordance with a further aspect of the invention, the method object of the invention uses embossing technologies, both analogue and digital, as an example texturing by means of inkjet texturing fluids. This technology is well described in WO2020039361A and WO201806987A1.

BRIEF DESCRIPTION OF THE DRAWINGS

1.1: unwinder
1.2: accumulation
1.3: tensioner
1.4: central drum
1.5: surface treatment (optional)
1.6: color inkjet printing
1.7: pinning
1.8: embossable formulation application
1.9: finishing coating application
1.10: photo-polymerization
1.12: adhesive application on the non-decorated side (optional)
1.11: rewinder

2.1: substrate to decorate
2.2: flexible film
2.3: embossable formulation
2.4: finishing coating
2.5: embossing cylinder
2.6 laminated and embossed surface

3.1: unwinder
3.2: accumulation
3.3: tensioner
3.4: central drum
3.5: surface treatment (optional)
3.6: color inkjet printing
3.7: pinning
3.10: photo-polymerization
3.8: embossable formulation application
3.11: digital texturing fluid application
3.9: protective formulation application to avoid cylinder dirting and backprinting dirting.
3.12: rewinder

4.1: ready-to-laminate film coated with the formulation of the invention
4.2: topcoat application
4.3: photopolimerization
4.5: embossing element

Figure 1:
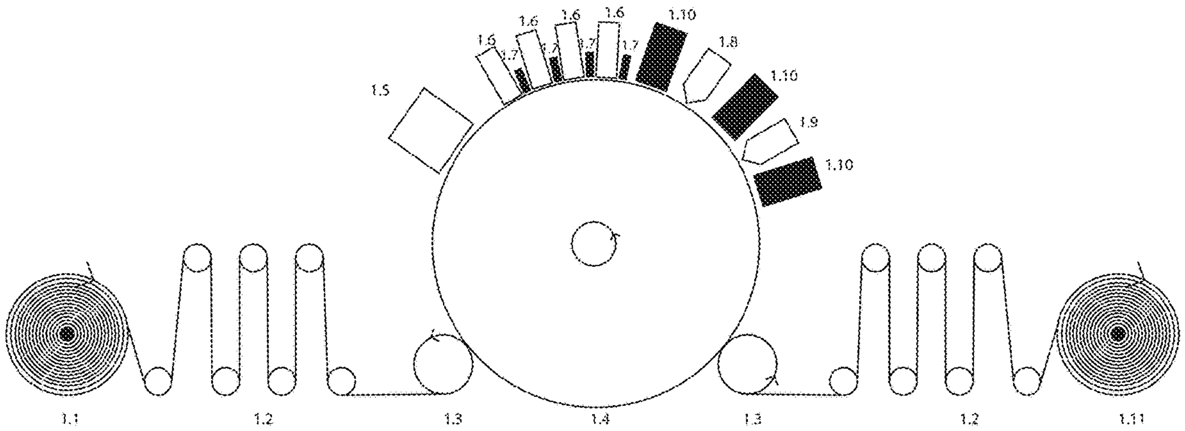
FIG. 1 illustrates a schematic reproduction of the process of the invention and at the same time a possible embodiment of the machinery for carrying out the method of the invention. In this case the method is carried out with inkjet printing and photo-crosslinkable coatings, there is also a station to apply the adhesive on the non-printed side of the flexible film.
Figure 2:
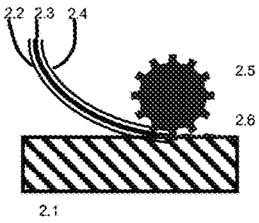
FIG. 2 illustrates the lamination and embossing of the ready-to-laminate film on the substrate to be decorated using an embossing cylinder.
Figure 3:
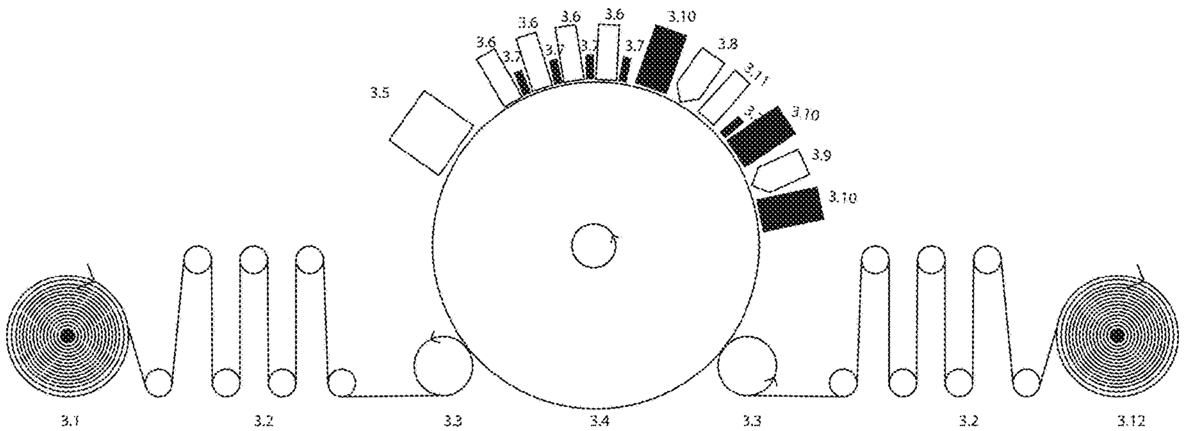
FIG. 3 illustrates a schematic reproduction of the process of the invention and at the same time a possible embodiment of the machinery for carrying out the method of the invention. In this case the method is achieved with inkjet printing and photo-crosslinkable coatings and digital texturing fluid.
Figure 4:
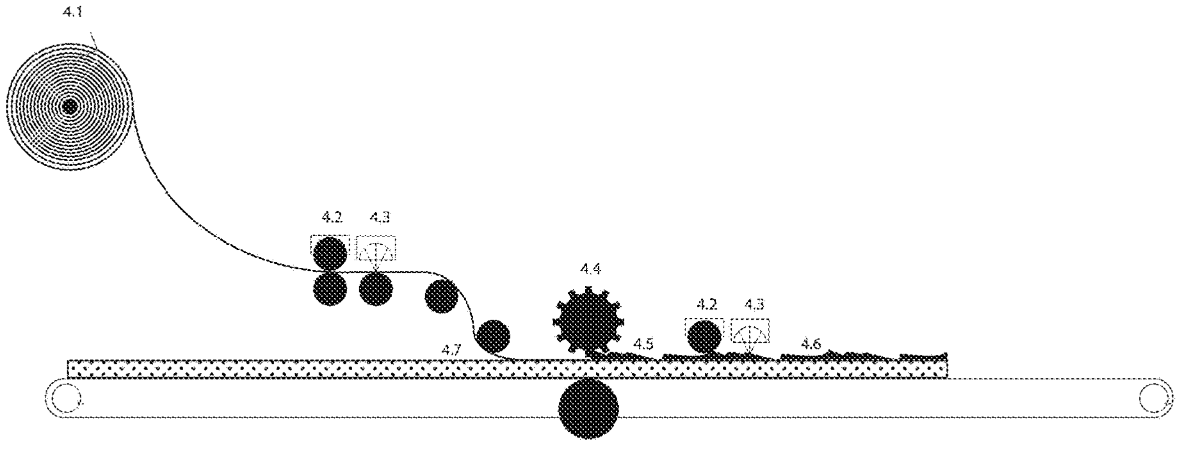
FIG. 4 illustrates the lamination and embossing of the substrate to be decorated using an embossing cylinder.
Figure 5:
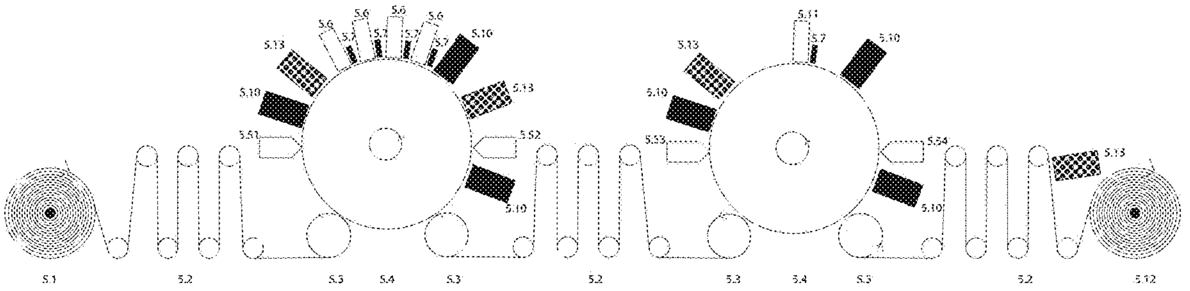
Figure 6:
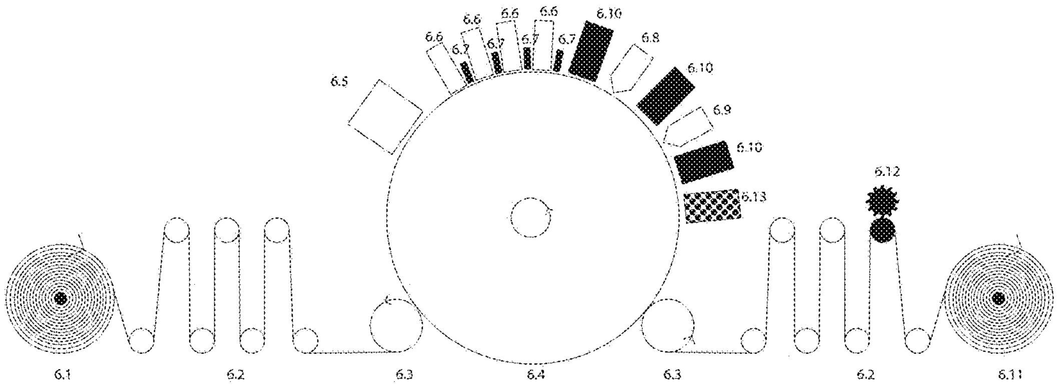

4.6: substrate to decorate
4.7: laminated and embossed substrate
4.8: laminated, embossed and coated substrate FIG. 5 illustrates a schematic reproduction of the process of the invention and at the same time a possible embodiment of the machinery for carrying out the method of the invention. In this case the method is achieved with inkjet printing and photo-crosslinkable coatings and digital texturing fluid on 2 central drum in series. In addition, the machinery is equipped with quality control tools:

5.1: unwinder
5.2: accumulation
5.3: tensioner
5.4: central drum
5.51: surface treatment (optional)
5.6: color inkjet printing
5.10: photo-polymerization
5.11: digital texturing fluid application
5.13: system for color control and/or superficial defects control and/or coating thickness control.
5.7: pinning
5.52: coating application to protect the print during the subsequent mechanical removal phase with texture creation.
5.53: embossing formulation application
5.54: protective formulation application to avoid cylinder dirtying and backprinting dirtying.
5.12: rewinder FIG. 6 illustrates a schematic reproduction of the process of the invention and at the same time a possible embodiment of the machinery for carrying out the method of the invention. Mechanical embossing is carried out in line with the printing and coating process. In this case the method is carried out with inkjet printing and photo-crosslinkable coatings:

6.1: unwinder
6.2: accumulation
6.3: tensioner
6.4: central drum
6.5: surface treatment (optional)
6.6: color inkjet printing
6.7: pinning
6.8: embossable formulation application
6.9: finishing coating application
6.10: photo-polymerization
6.11: rewinder
6.12: mechanical embossing
6.13: system for color control and/or superficial defects control and/or coating thickness control.

Figure 7:
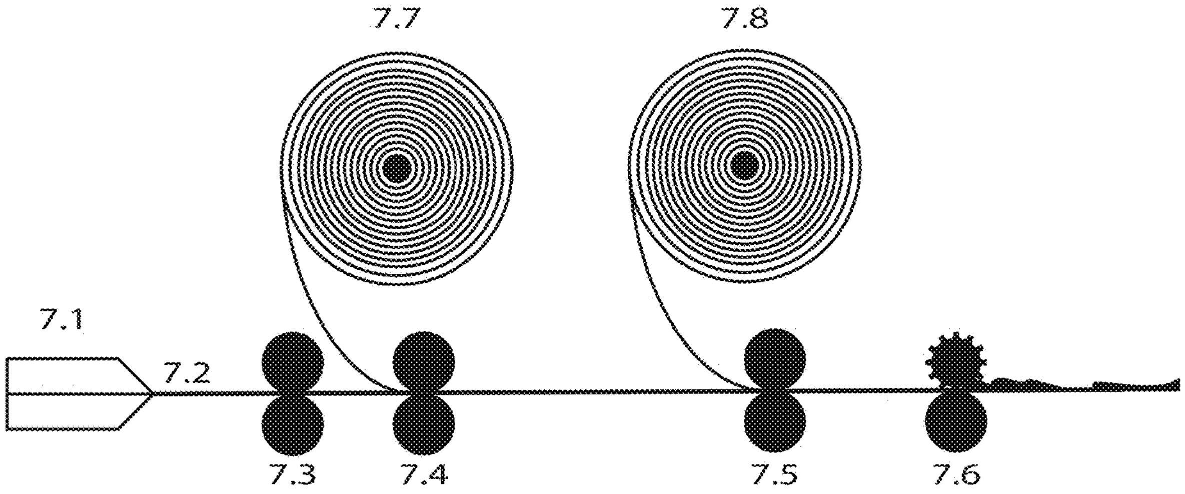

FIG. 7 illustrates a schematic reproduction of the process of the invention and at the same time a possible embodiment of the machinery for carrying out the method of the invention.

Figure 8:
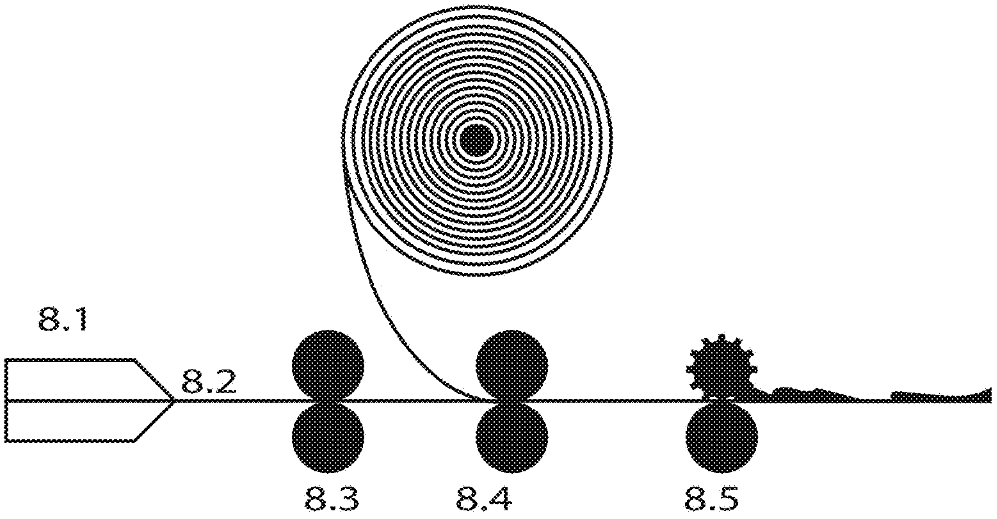

7.1: extruder
7.2: substrate
7.3: calenders
7.4: decorative film
7.5: protective film
7.6: embossing element
7.7: unwinder
7.8: unwinder FIG. 8 illustrates a schematic reproduction of the process of the invention and at the same time a possible embodiment of the machinery for carrying out the method of the invention.

Figure 9:
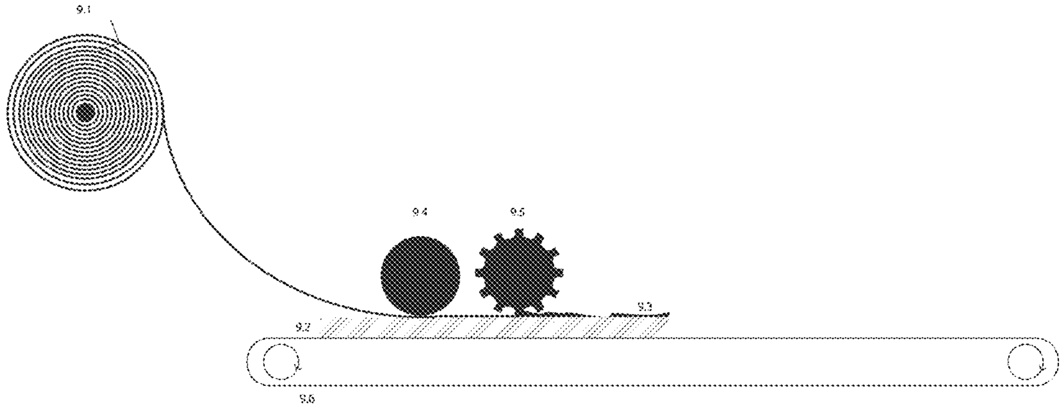

8.1: extruder
8.2: substrate
8.3: calenders
8.4: decorative film
8.5: embossing element FIG. 9 illustrates a schematic reproduction of the process of the invention and at the same time a possible embodiment of the machinery for carrying out the method of the invention.

Figure 10:
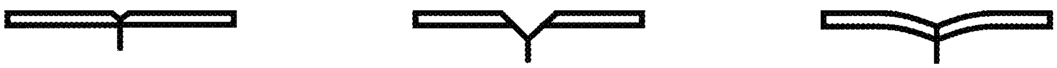

9.1: unwinder
9.2: substrate
9.3: embossing
9.4: lamination
9.5: mechanical embossing FIG. 10 illustrates a schematic reproduction of example bevels used in flooring production, according to an embodiment of the present disclosure.

10.1: micro bevel
10.2: painted bevel
10.3: pressed bevel

Figure 11:
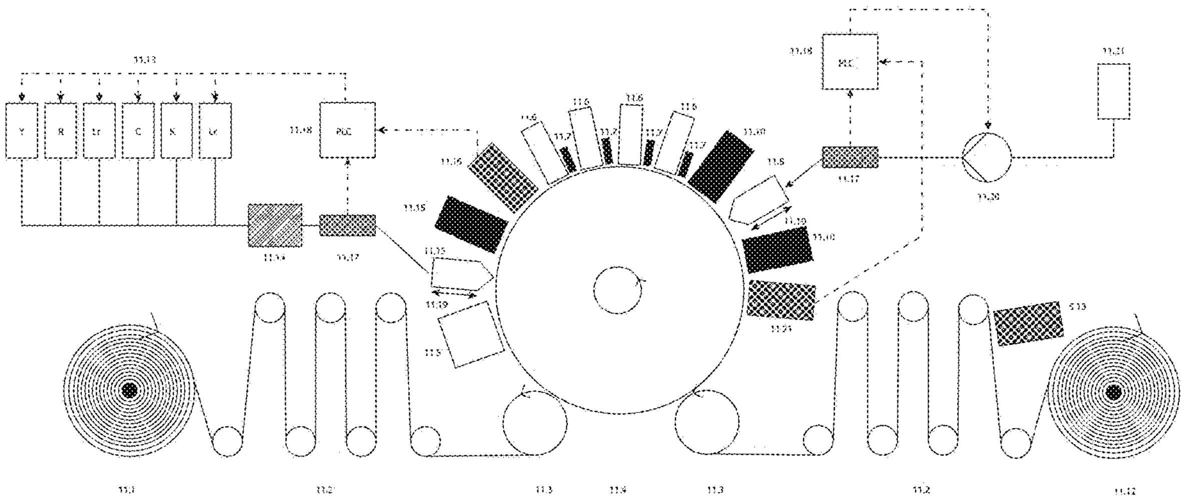
Figure 12:
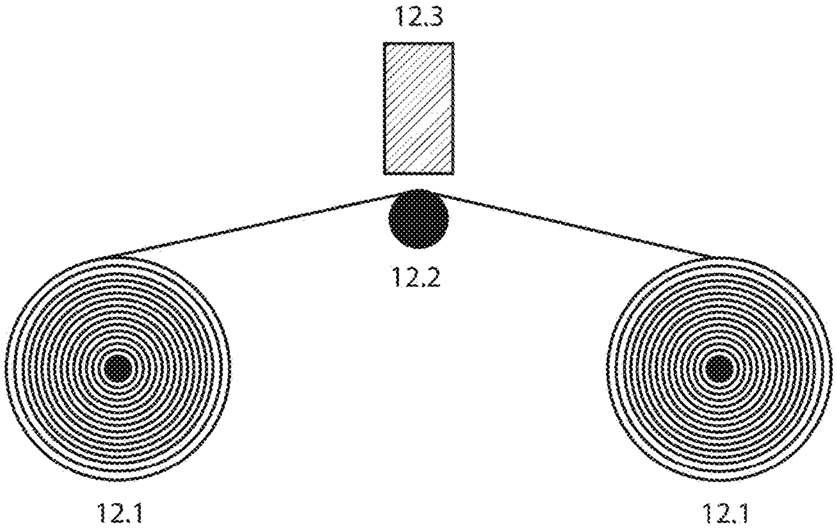

FIG. 11 illustrates a schematic reproduction of the process of the invention and at the same time a possible embodiment of the machinery for carrying out the method of the invention. In this case the method is carried out with inkjet printing and photo-crosslinkable coatings, a continuous mixer to generate the uniform color on-demand, a color measurement system to feedback and control the applied color, a station to apply the adhesive on the non-printed side of the flexible film:

11.1: unwinder
11.2: accumulation
11.3: tensioner
11.4: central drum
11.5: surface treatment (optional)
11.6: color inkjet printing
11.7: pinning
11.8: embossable formulation slot-die
11.9: finishing coating application
11.10: photo-polymerization
11.12: adhesive application on the non-decorated side (optional)
11.13: base colors
11.14: mixer
11.15: solid color application slot-die
11.16: in-line color measurement system
11.17: flowmeter
11.18: PLC or other logic controller
11.19: slot-die positioning system
11.20: embossable formulation feeding pump
11.2: in-line coating thickness measurement system
11.11: rewinder FIG. 12 illustrates a schematic reproduction of the process of the invention and at the same time a possible embodiment of the machinery for carrying out the method of the invention.

12.1: unwinder
12.2: common electrode
12.3: sensor electrode

Figure 13:
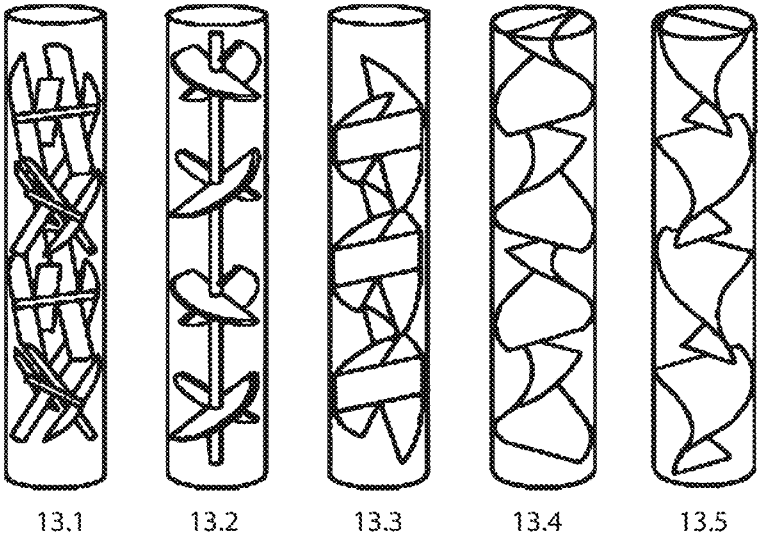

FIG. 13 illustrates a schematic reproduction of example mixers, in accordance one or more embodiments of the present disclosure.

Figure 14:
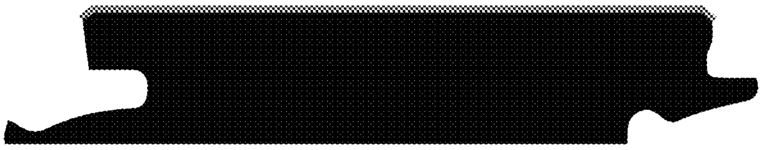

13.1: lamellar mixer
13.2: Ross LPD mixer
13.3: Komax mixer
13.4: Kenics static mixer
13.5: FixMix mixer FIG. 14 illustrates an example floor plank finished with an interlocking system, in accordance with one or more embodiments of the present disclosure.

DETAILED DESCRIPTION OF THE INVENTION

The applicant has found a method to decorate a material including the steps of:

a. Print an image or a solid color on at least part of a flexible film.
b. Cure/dry the ink.
c. Apply an embossable formulation, consisting of a photo-crosslinkable formulation containing at least one thermoplastic resin, to at least part of the flexible film.
d. Cure/dry the embossable formulation.
e. Laminate the decorated and coated flexible film (FIG. 8.6) with the embossable formulation onto at least part of a substrate (FIG. 8.2) to be decorated (FIG. 8.4).
f. Emboss at least the embossable formulation and/or the combination of said substrate and said film laminated thereon according to step e (FIG. 8.5).

Depending on the application (e.g. flooring, furniture, bath covering, wall covering), the substrate to be decorated can be made up of different materials such as wood and derivatives (MDF/HDH/Chipboard/OSB), polymers such as PVC and derivatives (SPC/LVT/WPC), polyolefins (PP, PE), polyesters, inorganic materials (calcium silicate, MgO), metals and combinations thereof. The raw materials could be virgin as well as totally or partially recycled. To reduce the weight, the substrate could be expanded/foamed. The expansion might be done by means of a blowing agent such as ADC (azodicarbonamide), rather than the use of a gas such as nitrogen. The thickness of the substrate to be decorated depends on the application and for example for floors it is typically 3-8 mm while for furniture it is 15-30 mm.

The flexible film is chosen according to the application, and it could be made of paper and derivatives, normally used for the decoration of wood or wood derivatives substrates; polymer films such as PE, PP (BOPP, CPP), PET, ABS, PVC; metals such as aluminum and combinations thereof. Thicknesses are generally <1 mm, typically between 30μ and 150μ.

For example, in the case of vinyl floors (SPC/LVT) a white PVC film with a thickness of 70-90μ is normally used. Alternatively, to produce PVC-free flooring, PP (CPP or BOPP) or PET films are used. To maximize the recyclability of the flooring, the decorative film and the core are of the same chemical nature, for example the BOPP/CPP film is laminated to the core made up of PP+fillers, similarly, the PET film is laminated to the core made up from PET+fillers.

In another form of the invention the decorative film is made of a thermo-adhesive material (tie-layer), in this way any applications of adhesive between the decorative film and the substrate to be decorated are not necessary. Thermo-adhesive film materials are commonly used to bond different materials and are for example marketed by Collano AG (Switzerland). Thermo-adhesive films can be supported by other materials such as paper or plastic films. The support could be useful to give greater stability to the thermo-adhesive film during the printing and/or lamination process.

The flexible film decorated and coated with the embossable formulation which is object of the invention could be used as is to decorate various surfaces. Optionally the film might have an adhesive side; the adhesive provided on the said adhesive side may be of the kind which is heat-activated and/or of the kind of a so called self-adhesive (PSA). Use of PSA might be interesting for Do-It-Yourself decoration and could be used as an alternative to wallpaper or to cover existing floors.

A first aspect of the invention is the creation of a decorated and coated film that can be mechanically embossed, such as, for example, by static pressing, continuous pressing (e.g. double belt presses), engraved cylinders. In the case of discontinuous pressing, mechanical embossing involves the use of embossing elements, while in continuous pressing double belt presses are normally used (produced for example by HYMMEN DE) in which the belt embossing element is engraved or an additional embossing element such as a ribbon or film is applied to the embossing belt (e.g. SAPPI embossing films/papers); finally, for continuous pressing, engraved cylinders might be used. The embossing elements can reproduce complex structures including structures with different depths, different thicknesses, and variations in gloss/brilliance. In all respects, the structures generated by pressing can present aesthetic characteristics and details superior to natural materials.

Unlike melamine surfaces (laminates), to date, for vinyl floors (SPC/LVT) it is not possible to generate surfaces with different gloss/brilliance by pressing. In fact, although PVC, given its thermoplastic characteristics, can generate glossy/matt surfaces with dedicated embossing elements, for practical purposes the application of the topcoat, necessary to guarantee resistance to scratches and stains, equalizes the surface with a uniform gloss.

According to an embodiment which can be provided alternatively or in combination to one or more of the other embodiments as far it is not technically in contradiction, the embossing element is heated, preferably between 40 and 220° C., the temperature being a function of the composition, Tg and/or softening point of the polymerized/solidified embossable formulation. Alternatively, the embossing element may not be heated but the cured photo-crosslinkable formulation may be heated prior to the embossing step.

According to an embodiment which can be provided alternatively or in combination to one or more of the other embodiments as far it is not technically in contradiction, the embossable formulation is heated to or above its Tg and the embossing element is cooled to below the embossable formulation Tg. In this way the structure is "frozen" increasing its definition and/or depth.

According to an embodiment which can be provided alternatively or in combination to one or more of the other embodiments as far it is not technically in contradiction, embossing occurs without the need for heating the embossing element and/or the embossable formulation.

According to an embodiment which can be provided alternatively or in combination to one or more of the other embodiments as far it is not technically in contradiction, the substrate to be decorated is preheated before laminating the decorated film coated with the embossable formulation object of the invention. For example, in the case of SPC, the substrate can be laminated after the extrusion phase while it is still hot. Preheating facilitates the lamination of the decorated and coated film with the embossable formulation object of the invention.

According to an embodiment which can be provided alternatively or in combination to one or more of the other embodiments as far it is not technically in contradiction, the flexible film to be decorated is colored in the mass or coated on the surface. In fact, to reduce the quantity of printed ink and/or improve the quality of the image the flexible film could be colored, for example, in the case of wood reproduction it could be a light brown background. A limitation of inkjet printing is the ability to generate solid colors. In fact, the solid colors generated by an inkjet system normally show non-uniformity of color due to different densities of the same. In addition to this problem, inkjet printing is characterized by missing nozzles, i.e. nozzles that do not shoot the ink correctly, producing white lines, which are particularly visible in solid colors. Advantageously the color might be produced on demand by mixing specific colors (11.13) in line using a continuous mixer (FIG. 11.14) like a static mixer, controlled by a flowmeter (FIG. 11.17) and applied by means of a slot-die (11.15). Preferably the mixer is of static type FIG. 13, e.g. 13.1 lamellar (Sulzer SMX) mixer, 13.2 Ross LPD mixer, 13.3 Komax mixer, 13.4 Kenics static mixer, 13.5 FixMix mixer. Preferably the colors have low viscosity to ease mixing. Advantageously the colors might be the same used for the inkjet printing (Cyan, Magenta, Red, Yellow, Black and/or their light version) or dedicated colors might be selected to achieve the desired gamut (Orange, Violet, Green).

According to an embodiment which can be provided alternatively or in combination to one or more of the other embodiments as far it is not technically in contradiction, the base color applied on the film is generated by overlapping one or more colored layers. To maximize the overlapping effect, the colors are preferably transparent and obviously, the more colors are being used, the greater the gamut that can be obtained. Again, because of then high transparency (submicronic pigment particle size) inkjet colors are ideal for these applications. Similarly, by varying the quantity of colored coating applied, different color densities will be obtained and a further extended gamut will result. Preferably, the colored layers are first dried/polymerized and subsequently overlapped. In another form of the invention, the colored layers can be overlapped before their drying/polymerization. This overlapping technology, called overprinting, is well described in the book "*Color by overprinting; A complete guidebook in the art and printing techniques employing transparent inks in multiple combinations—January* 1, 1955".

According to an embodiment which can be provided alternatively or in combination to one or more of the other embodiments as far it is not technically in contradiction, the color application of the above-mentioned embodiments might be controlled by an in-line color (11.16) measurement system, such as a spectral camera and/or color image sensor. Based on the measured value, the applied color amount and/or color mix might be accordingly tuned.

According to an embodiment which can be provided alternatively or in combination to one or more of the other embodiments as far it is not technically in contradiction, the decoration could be carried out on the unprinted side of an already decorated film. This methodology could be useful for recovering films that are no longer usable, reducing waste and warehouse stocks.

In a preferred embodiment of the invention, the printing ink, the embossable formulation, the finishing varnish, the printing primer and more generally the liquid layers composing the method object of the invention are of a photo-crosslinkable nature.

Photo-crosslinkable resins or rather, energy-curable resins have in common the fact that they polymerize and harden thanks to the energy irradiated by ultraviolet ray devices and/or by irradiation with EB (Electron Beam) they are divided into two types based on the cross-linking mechanism:

1) RADICALICIC, typically made of vinyl monomers and acrylate resins which are divided in different subcategories, including: epoxy-acrylate, urethane-acrylate, polyester-acrylate, polyether-acrylate, amino-acrylate, silicon-acrylate, polyisoprene-acrylate, polybutadiene acrylate and acrylate monomers. Among the vinyl monomers we can mention N-vinylcaprolactam (NVC), acryloylmorpholine (ACMO), diethylene glycol divinyl ether (DVE-2), triethylene glycol divinyl ether (DVE-3) and their mixtures.

The term acrylate refers to both acrylate and methacrylate resins.

2) CATIONIC, such as epoxy resins, polyols and monomers such as oxetanes and vinyl ethers.

The photo-crosslinking technology is well described in the book "*Radiation Curing: Science and Technology*" (Pappas).

In another preferred embodiment, formulations based on dispersed and/or dissolved thermoplastic resins capable of forming a film could be used while maintaining the thermoplastic properties after the removal of the solvent or dispersion vehicle. For example, acrylic resins dissolved in a suitable solvent could be used. Among the various acrylic resins that can be used we can mention Degalan (EVONIK), Elvacite (LUCITE), Joncryl (BASF), Neocryl (COVESTRO), Paraloid (DOW).

In a further preferred embodiment of the invention, the embossable formulation is made of a photocurable resin in which a thermoplastic resin is dissolved and/or dispersed. In this way the thermoplastic resin will impart to the system thermoplastic characteristics, obtaining better embossing capabilities and reducing the system relaxation with reduced emboss (partial) loss. Improving the Tg by increasing it, will also improve the temperature stability. Therefore, the selection and combination of photocurable resins and thermoplastic resins with high Tg will improve the system stability. The thermoplastic resin will also impart system flexibility reducing the shrinkage and consequently the curling. Typically, the thermoplastic resin is used dissolved in the photo-crosslinkable resin between 1% and its solubility limit which is a function of the chemical nature of the resin and its molecular weight. In another form of the invention, the thermoplastic resin is not dissolved in the photo-crosslinkable resin but is dispersed therein.

Thermoplastic resins which might be used in combination with photo-crosslinkable systems, for example one or more of the above disclosed examples of photo-crosslinkable resins or systems can be part but not limited of the following type:

acrylonitrile butadiene styrene (ABS)
polyvinyl chloride (PVC)
ethylene vinyl acetate copolymer (EVA)
polylactic acid (PLA)
polyamide (PA)
polybenzimidazole (PBI)
polycarbonate (PC)
polyethersulfone PES (U)
polyethylene (PE)
polyethylene terephthalate (PET)
polymethyl methacrylate (PMMA)
polyoxymethylene (POM)
polypropylene (PP)
polystyrene or polystyrene (PS)
polytetrafluoroethylene (PTFE)
thermoplastic polyurethanes (TPU)
polyvinyl acetate (PVAc)
thermoplastic acrylic resins
SBS resins
SEBS resins.
SEEPS resins
SEPS resins
SIS resins and/or mixtures and/or copolymers of the previous ones.

Thermoplastic resins are normally characterized by:

- Aspect, e.g. granules, powder, tablets, flakes.
- Glass transition temperature Tg and softening point, useful to understand at which temperature the resin assumes viscous behavior.
- Molecular weight, useful for understanding the solubility in the photo-crosslinkable formulation.
- Fluidity of the molten resin.
- Acidity number, useful for understanding compatibility/incompatibility with other chemical species.
- Viscosity of the melt or in solution.
- Functionalization, such as the presence of amino, carboxyl, maleic, hydroxyl groups, isocyanates capable of reacting in primary or secondary reactions.

According to a further feature, thermoplastic resins listed above might be functionalized with various chemical groups such as maleic, hydroxyl, carboxyl, amino, isocyanate, glycidyl groups. These groups can participate in secondary reactions (dual-cure) useful for improving the performance of the system itself. For example, the hydroxyl group can react with a —CNO group to form a urethane bond, while the —COOH group can react with TGIC (triglycidyl isocyanurate), triglycidyl methacrylate or with amino and/or hydroxyl groups.

embossable formulation object of the method of the invention might contain further components such as other non-photo-crosslinkable and non-thermoplastic systems such as epoxy, polyurethane and acrylic resins. These non-photo-crosslinkable systems might be used to modify the rheological characteristics (e.g. viscosity, thixotropy) and/or the chemical-physical characteristics (e.g. hardness, flexibility, scratch resistance, abrasion resistance and/or the possibility of secondary reactions occurring (dual-cure).

According to an embodiment which can be provided alternatively or in combination to one or more of the other embodiments as far it is not technically in contradiction, between the various layers applied such as the printing ink, the embossable formulation, the finishing varnish, the printing primer and more generally the layers making up the method, which is the object of the invention and disclosed according to the preceding embodiments, a chemical reaction occurs. For example, one layer may contain isocyanate groups and the next and/or previous adjacent layer may contain hydroxyl groups forming a urethane-type bond between the said two adjacent layers.

| PROCESS | FUNCTIONAL GROUPS |
|---|---|
| DUAL-CURE<br>Isocyanate-alcohol or water<br>Melamine-alcohol |  |
| THERMAL<br>Epoxy-acid<br>Epoxy-amine<br>Cationic UV (epoxy) | 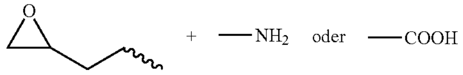 |
| THERMAL CROSS-LINKING OF ACRYLATES<br>Peroxides, TRI (thermal Radicalic initiator). | |
| OXIDATIVE DRYING | 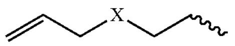 |
| CURING WITH HUMIDITY | 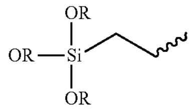 |

The same type of thermoplastic resins can be used for the solvent-based embossable formulation while for the water-based dispersions polyurethane and/or acrylic resins might be used.

According to an embodiment which can be provided alternatively or in combination to one or more of the other embodiments as far it is not technically in contradiction, the embossable formulation object of the method of the invention comprises one or more photo-crosslinkable resins, photoinitiators, one or more thermoplastic resins and it might optionally contain one or more of the following additives such as one or more fillers, such as aluminum oxide (corundum) to increase the abrasion resistance, talc to modify the rheology, silica to reduce the gloss, calcium carbonate as a filling filler, pigments to impart colour, additives such as levelling, wetting, slipping, rheology modifying agents and in general additives and components commonly used in coatings for wood and/or flooring.

According to an embodiment which can be provided alternatively or in combination to one or more of the other embodiments as far it is not technically in contradiction, the The most common method is the combination of radiation polymerization with thermal cross-linking. Thermal cross-linking methods come in many variations. There are numerous possible combinations of radiation hardening with thermal hardening, such as the common reaction of the hydroxyl group (e.g. SR 444D, CN 7672) containing unsaturated acrylic esters with isocyanic resins (e.g. LAROMER 9000, EBECRYL 4141, EBECRYL 4397 EBECRYL 4155, EBECRYL 4250) or melamine cross-linkers (e.g. CYMEL). These acrylates containing OH groups might be applied in two-component systems in combination with polyisocyanates or as one-component coatings in combination with melamine resins, so that following radiation and thermal cross-linking a homogeneous network of radicalic polymerized acrylates and thermally cross-linked groups results.

Other applicable systems can be based on epoxy groups introduced into acrylic esters, so that induced cationic epoxy curing occurs via thermal latent acid donors as a UV light-independent mechanism, or the epoxy acrylates can be cross-linked with carboxylic acid or amino group containing resins.

Other possibilities are the combination of acrylates with oxidative drying groups, which polymerize slowly with oxygen analogous to alkyd resins.

Alternatively, photo-crosslinkable aqueous dispersions often exhibit physical drying without radiation curing. Polyurethane dispersion resins, for example, have a much higher molecular weight than traditional 100% UV resins and can be designed to provide glass transition temperatures of uncured coatings above room temperature. They can be cross-linked in areas of use by radiation hardening to deliver the designated performance spectrum and solidified in shadow areas, where often the requirements are only related to low emissions, low migration and low odor.

A further curing mechanism is moisture curing. Moisture-hardening are, for example, siloxane or isocyanate groups. Compounds containing both unsaturated acrylates and free siloxanes or isocyanate groups are commercially available. A particularly useful polymer having free isocyanate and unsaturated acrylic ester functions (Laromer LR 9000) has recently been introduced. This molecule can be used as a polyisocyanate component in the formulation of UV-curable 2K systems in combination with hydroxyl-containing resins, or as a sole binder resin using moisture curing of the isocyanate groups, and as a primer resin, where the isocyanate groups react with the functional groups of the substrate. For example, the reaction between the NCO groups of the resin with their respective reaction partners in the substrate (—OH, —COOH, etc.) results in excellent adhesion to the substrate.

A further possibility of dual-cure systems is the further thermal polymerization of the unsaturated acrylate groups using peroxides, benzpinacol (tetraphenyl ethanediol) or other thermally latent Radicalic formers (TRIs). In these formulations both radiation-induced and thermally induced polymerization use the same functional groups and therefore, at least theoretically, should provide the same network.

According to an embodiment which can be provided alternatively or in combination to one or more of the other embodiments as far it is not technically in contradiction, locked reactive systems can be used which are then unlocked on command by a certain event, such as reaching a certain temperature. Blocked isocyanates are part of this product category. Alternatively, melamine resins can be used which are stable at room temperature and which are activated at high temperatures, typically >100° C. In addition to temperature, secondary reactions could be activated by UV irradiation. For example, PAGs (photo acid generators) can generate acids that might act as catalysts for secondary reactions. In addition to PAGs, PBGs (photo base generators) could be exploited which, unlike PAGs, basic species such as amines are released during irradiation. Cationic photoinitiators can also be used for this purpose, as they release acids upon irradiation. To ensure the mobility necessary for the secondary reactions to occur, it may be useful to partially polymerize the system, after which it reaches the temperature necessary for the secondary reaction to occur and then complete the photopolymerization by further irradiation. Partial polymerization could be carried out using traditional arc lamps or better yet using LED lamps which are more effective thanks to the monochromatic emission. Alternatively, the secondary reaction might occur before photopolymerization.

According to an embodiment which can be provided alternatively or in combination to one or more of the other embodiments as far it is not technically in contradiction, the embossable formulation doesn't contain any thermoplastic resin but it's a photo-crosslinkable formulation with dual-cure mechanism. In fact, the use of dual-cure systems would help to minimize polymer relaxation and maintain the mechanically embossed texture.

According to an embodiment which can be provided alternatively or in combination to one or more of the other embodiments as far it is not technically in contradiction, the embossable formulation object of the invention is colored by the addition of pigments or dyes and in turn can be printed before or after embossing.

In a preferred aspect of the invention the embossable formulation object of the invention possesses anti-abrasive and/or anti-scratch properties and can be made three-dimensional by means of mechanical embossing and/or by means of digital texturing, for example by means of inkjet, for example by applying by inkjet printing droplets of an embossing liquid onto the layer of embossable formulation. Furthermore, the embossable formulation object of the invention possesses plasticity and/or elasticity characteristics capable of limiting the deformation effect already mentioned previously. This deformation defined as (bending/cupping/curling) is due to the shrinkage of the photo-crosslinkable formulations and is accentuated by heat. The deformation can be both longitudinal and transversal and in addition to heat it is accentuated by the amount of photo-crosslinkable formulation applied. On the other hand, as mentioned previously, the demanding specifications of flooring imply large amount of coating applied which only worsen this phenomenon.

According to an embodiment which can be provided alternatively or in combination to one or more of the other embodiments as far it is not technically in contradiction, an adhesive is applied between the film decorated and coated with the embossable formulation object of the invention and the substrate to be decorated. This adhesive could be in liquid form, such as solvent or water-based acrylic, vinyl, SBR-based or hot-melt type. These types of adhesives are normally applied to one or both materials to be bonded shortly before bonding. Alternatively, the adhesive is in solid form, an adhesive film commonly called a tie-layer. The use of the adhesive film could have multiple reasons such as lowering the lamination temperature and/or making the two layers to be laminated compatible which would otherwise be difficult to laminate. Examples of tie-layers are the adhesive films marketed by Collano (CH) or BEMIS (US). A further type of adhesive could be a self-adhesive (PSA—pressure sensitive adhesive) which has the advantage of being able to be applied at different times after application. For specific applications, the adhesive could be applied on both materials to be coupled and different types of adhesives could be used in combination with each other.

According to an embodiment which can be provided alternatively or in combination to one or more of the other embodiments as far it is not technically in contradiction, embossing takes place using successive applications of two or more embossing elements.

In a further embodiment of the invention, the embossing occurs in register with the underlying image. This is made possible with the use of embossing elements specifically dedicated to each type of printed image. Moreover, to achieve better EIR combination of printed references and optical systems as cameras might be used.

According to an embodiment which can be provided alternatively or in combination to one or more of the other embodiments as far it is not technically in contradiction, the embossing extends to the substrate to be decorated, i.e. the substrate is also embossed, thus maximizing the depth of the texture generated. To this end, intermediate layers, even undecorated, could be applied to the surface of the substrate, with the sole function of increasing the thickness of the embossable layer or making embossing easier.

According to an embodiment which can be provided alternatively or in combination to one or more of the other embodiments as far it is not technically in contradiction, the embossing element, which might be flexible (e.g. embossing paper, embossing film) or rigid (e.g. press plate, metal belt, calender), continuous or discontinuous, is texturized by digital technology and preferably by inkjet. Typically, the creation of embossing elements with digital technology involves the overlapping of successive layers of photo-crosslinkable resins, after polymerization/gelling of each individual layer. In this way embossing element can be produced just in time, obtaining the flexibility necessary for the decoration method which is the object of the invention. The digitally printed embossing elements might be printed on flexible materials, such as plastic films or paper or on rigid materials such as metals.

According to an embodiment which can be provided alternatively or in combination to one or more of the other embodiments as far it is not technically in contradiction, the photo-crosslinkable embossable formulation is fully cured before being embossed. This avoids detachment from the substrate due to poor adhesion and prevents the photo-crosslinkable embossable formulation from sticking to the embossing element. Optionally, after embossing, the photo-crosslinkable embossable formulation could be irradiated again to complete the polymerization and/or increase its mechanical characteristics.

According to an embodiment which can be provided alternatively or in combination to one or more of the other embodiments as far it is not technically in contradiction, the application of the film decorated and coated with the embossable formulation to the substrate to be decorated occurs simultaneously with the embossing of the same. This operation is common on certain SPC/LVT lamination lines.

According to an embodiment which can be provided alternatively or in combination to one or more of the other embodiments as far it is not technically in contradiction, the film decorated and coated with the embossable formulation is first laminated (FIG. 9.4) to the substrate to be decorated (FIG. 9.2) and is subsequently mechanically embossed (FIG. 9.5). Lamination and embossing can also be done at different times over time.

According to an embodiment which can be provided alternatively or in combination to one or more of the other embodiments as far it is not technically in contradiction, the film decorated and coated with the embossable formulation is embossed before lamination (FIG. 6.12). Once embossed the film can be rewound and subsequently laminated. For example, the decorated and embossed film can be used to cover profiles such as skirting boards and door profiles. For example, profile wrapping lines are produced by Barberan (ES) and CEFLA (IT). The decorated and embossed film is generally laminated to the profile using rollers, with the aid of hot-melt adhesive or alternatively with water- or solvent-based adhesives. In addition to profiles, the decorated and embossed film can be used to decorate panels.

In a further preferred embodiment of the invention, the texturing of the embossable formulation is of the digital type and involves localized applications, defined by digital templates, of texturizing liquid on the surface of the formulation which is the object of the invention. The texturizing liquid is capable of deforming in a controlled manner and/or modifying the chemical-physical characteristics of the embossable formulation in the areas to which it is applied, such as selectively inhibiting the polymerization of the photo-crosslinkable embossable formulation. Examples of these technologies will be better described below and already reported in patent applications WO2018069874A1 and WO2020039361A1. After the application of the texturizing liquid, to prevent the texturizing liquid from soiling the back of the film once rewound, a protective layer is applied on the surface of the embossable formulation on which the texturizing liquid has been applied. The protective layer can be made up of a coating, preferably photo-crosslinkable, and is applied at low weights, typically 4/6 $g/m^2$. The coated film with the embossable formulation on which the texturizing liquid has been applied is laminated to the support to be decorated and subsequently the texture such as the texturing liquid and/or a combination of texturing liquid and part of the embossable formulation is released by mechanical action. The protective layer can be applied using both analogue and digital technologies.

According to an embodiment which can be provided alternatively or in combination to one or more of the other embodiments as far it is not technically in contradiction, the creation of the texture occurs by means of controlled depositions of photo-crosslinkable liquid (additive texturing). Preferably the application takes place using inkjet heads and depending on the desired depth/thickness of the texture, multiple heads can be used in series. Preferably after each application the photo-crosslinkable liquid is (partially) polymerized. The heads in series could print using the same file or alternatively the files could be different to optimize the structure/definition of the texture. For example, the first row of heads could print the base of a “peak” and the subsequent ones, print subsequent parts overlapping the base in a manner very similar to the logic of filament 3D printers. Additive texturing could also be used in combination with mechanical embossing or digital texturing or in combination with both.

In a preferred embodiment of the invention the photo-crosslinkable embossable formulation is embossed both mechanically and digitally. In fact, digital embossing (as for example described in WO2020039361A1, although presenting countless advantages, presents some critical issues, especially when the areas to be removed are large. In fact, for large areas to be removed, there are both brushing issues due to the abundance of material removed and at the same time the removal of the material involves a decrease in abrasion resistance due to a reduction in the amount of anti-abrasive photo-crosslinkable formulation. Therefore, it is particularly advantageous to use digital technology in combination to create fine embossing and mechanical embossing for large embossing such as, for example, the reproduction of saw-cuts. Obviously digital embossing will benefit from registering while, mechanical embossing will not be in register, however this does not represent a particular limitation as large embossing is often not made in register.

According to an embodiment which can be provided alternatively or in combination to one or more of the other embodiments as far it is not technically in contradiction, mechanical embossing, digital texturing, and additive texturing are combined. In fact, the combination of the three types of texture creation techniques might be useful for creating and expanding unique aesthetic and tactile effects.

According to an embodiment which can be provided alternatively or in combination to one or more of the other embodiments as far it is not technically in contradiction, the flexible film to be decorated is pre-treated before printing. The pretreatment can be chemical-physical, such as corona treatment, flame, plasma and/or by applying a primer. The pretreatment is useful both to guarantee adhesion of the subsequent layers to the film itself and/or to improve the printability of the film itself by optimizing the deposition and expansion of the ink droplet.

According to still a further embodiment which is provided in any combination or sub-combination with one or more of the previous embodiments, on the embossable formulation it is possible to apply a further finishing layer, for example, a layer capable of varying the gloss of the surface of the decorated substrate. The finishing layer can be applied both on the decorated film and on the decorated substrate on which the decorated film was previously applied. In the case of mechanical embossing, it is preferable to apply the finishing layer such as for example a finishing varnish before embossing while in the case of digital texturing it is preferable to apply the said finishing layer after the mechanical removal of the texture as the finish itself could be damaged with it. As per the state of the art, the finishing layer is generally applied between 6 and 12 $g/m^2$, in one or more passes. Generally, to impart the desired scratch and stain resistance properties the finishing layer is highly cross-linked/polymerized.

According to an embodiment which can be provided alternatively or in combination to one or more of the other embodiments as far it is not technically in contradiction, the embossable formulation object of the invention is embossed without applying the finishing layer, as for example a topcoat thereon. In this way, the thermoplastic properties of the formulation can be exploited to create glossy/matt effects on its surface. In fact, similarly to melamine surfaces, press plates or more generally embossing elements can be used which, in addition to the main texture (such as the wood grain), present matt and/or glossy areas. Given the thermoplastic characteristics of the embossable formulation object of the invention, after pressing both the texture and the glossy/matt areas present on the embossing element will be reproduced.

According to an embodiment which can be provided alternatively or in combination to one or more of the other embodiments as far it is not technically in contradiction, the embossable formulation is applied in a single application in quantities that depend on the desired depth of texture and/or the required performance, such as the abrasion resistance. The embossable formulation might impart the desired gloss too, avoiding the subsequent application of the finishing layer. To impart the low gloss (<10 GU at 60°), the embossable formulation might contain inorganic matting agents such as silica, aluminum oxide and/or organic matting agents such as micronized polymers (e.g. PP/PE/PA), waxes. In general state-of-the art matting technologies might be used to achieve the desired gloss (*Low-gloss UV-curable coatings: Light mechanisms, formulations and processes—A review,* 2022, ELSEVIER)

According to an embodiment which can be provided alternatively or in combination to one or more of the other embodiments as far it is not technically in contradiction, the embossable formulation is applied with a thickness equal to or greater than the size of any solid fillers in the formulation. For example, if the formulation contains aluminum oxide with a maximum dimension of 70μ, the embossable formulation should be applied with a thickness of at least 70μ.

According to a preferred embodiment the present invention provides for a flexible substrate printing and coating machine comprising unwinding element/elements for advancing material in web form to be decorated which are provided at least with a traction drum (central drum) which is designed to receive, at an entry region, the material in web form to be decorated and to convey it toward an exit region spaced circumferentially apart, along the direction of rotation of the traction drum about its own axis, from the entry region; analog coating stations and digital printing stations are arranged around the traction drum (central drum), between the entry region and the exit region and, conveyance means are provided for conveying the material in web form to be decorated which arrives from the traction drum (central drum) along an advancement path that has at least one advancement portion for advancing the material in web form to be decorated which extends substantially straight.

The use of the central drum is very common in flexographic printing and has several advantages compared to the more common in-line and stack printing, such as:

Easy film tensioning.

Temperature control as the drum can be thermoregulated.

Easy printing registration.

Non limiting examples of the printing and coating machine meant to be used to produce the ready-to-laminate film object of the invention are illustrated in FIG. 1, FIG. 3, FIG. 5, FIG. 6.

For the non-digital layers application, e.g. primer, white base, embossable formulation, topcoat, common application technologies such as roller coater, flexographic groups, knife coater, rotogravure cylinder, slot-die could be used.

In a preferred form of the invention the non-digital layers application and particularly the embossable formulation is applied in a single application using a slot-die. The slot-die is a highly versatile tool to apply liquid layers as the amount of applied fluid might be defined by selecting the internal manifold geometry and/or the shim thickness and/or the lip geometry as well as process tuning like the fluid flow rate and/or the distance to the substrate. The amount of material applied might be monitored using a flow and/or mass meter (FIG. 11.17). In this way, with the help of PLC (Programmable Logic Controller) or similar systems (11.18), it is possible to create recipes based on desired product specifications. For example, a certain degree of abrasion resistance could be selected by the user on the machine logic controller and the specific amount of coating would be applied accordingly.

According to an embodiment which can be provided alternatively or in combination to one or more of the other embodiments as far it is not technically in contradiction, the flow of the various components of digital fluids and/or the non-digital layers are monitored with the use of flowmeters providing important information both for printing and maintenance. As an example, printing requires the ink flow is constant and balanced between the various heads. The use of MEMS flow meters is particularly efficient, such as, for example, those produced by SENSIRION which, in addition to their small dimensions, also provide the precise value of the temperature of the monitored fluid.

According to an embodiment which can be provided alternatively or in combination to one or more of the other embodiments as far it is not technically in contradiction, the embossable formulation and the topcoat are applied simultaneously using a slot-die with 2 outputs (multilayer slot-die).

According to an embodiment which can be provided alternatively or in combination to one or more of the other embodiments as far it is not technically in contradiction, the primer, the inks, the embossable formulation, the finish (topcoat) and in general the various components of the decoration cycle are of a photo-crosslinkable nature, and the polymerization takes place by means of irradiation with LED lamps. The use of LEDs, especially in the printing phase, is ideal as LEDs do not emit heat as much as traditional arc lamps and in this way the distortion of both the film itself and the machinery are reduced with consequent improvement in print quality.

According to an embodiment which can be provided alternatively or in combination to one or more of the other embodiments as far it is not technically in contradiction, in addition to traditional arc lamps and LED lamps, excimer lamps can be used which emit almost monochromatic vacuum ultraviolet radiation, typically at 172 nm. This radiation is usually used to matt surface coatings. Excimer lamps could be used to matt one or more of the layers making up the cycle that is the object of the invention. They could be used to matt the wear layer without the need to apply subsequent layers (topcoat) and/or used to matt the topcoat itself. Excimer technology normally involves irradiation in an inert atmosphere (N2) and subsequent polymerization using traditional arc lamps.

According to an embodiment which can be provided alternatively or in combination to one or more of the other embodiments as far it is not technically in contradiction, the application of the various layers making up the decorative cycle is carried out in several stages. It is useful in the case of the embossable formulation which could be applied in large quantities to maximize the depth of the embossing.

In a preferred embodiment of the invention, the printing is of the inkjet type. Inkjet printing can be either in multi-pass/scanning mode where the image is generated with multiple passes of the head while the material to be decorated advances or in singlepass mode, where the material to be printed passes only once under the heads which are installed at the width of the same material. Singlepass printing is used for large runs (>1000 m2/h) while multipass printing, used for small and medium runs (10-600 m2/h), is the most common. Typically, inkjet printing involves the use of a head to create and throw droplets of liquid which will then form the image to be printed. As an example, details of this type of printing can be found in the book "*Fundamentals of inkjet printing: the science of inkjet and droplets*" (Hoath, Stephen). Depending on the inkjet head used, the droplets produced can have different volumes and consequently different diameters. In addition to the native droplet size, an intrinsic characteristic of the head, larger droplets can be generated by the head itself. For example, a head capable of printing 4 levels of gray will have the smallest drop of 6 pl while the largest will be 18 pl.

In addition to inkjet printing, it is possible to use digital toner printing (laser), liquid toner (HP INDIGO type) or traditional analog printing such as flexography, engraving, offset, rotogravure, screen printing and combinations of the same.

According to an embodiment which can be provided alternatively or in combination to one or more of the other embodiments as far it is not technically in contradiction, the film to be decorated is preheated to the same temperature as the central drum. In fact, the temperature has a notable influence on the printing quality as the expansion of the drop on the film to be decorated also depends on the temperature of the film itself. In general, the higher the temperature, the greater the expansion of the drop.

According to an embodiment which can be provided alternatively or in combination to one or more of the other embodiments as far it is not technically in contradiction, an in-line control of the printing quality is carried out by using a suitable measurement system such as, for example, a hyperspectral or multispectral camera. This system is in fact capable of obtaining the emission or transmission spectrum of the printout and, for example, comparing it with a standard printout, highlighting any differences. In case of anomalies, the system may also provide information to adjust the heads and avoid further deviations.

According to an embodiment which can be provided alternatively or in combination to one or more of the other embodiments as far it is not technically in contradiction, an in-line control of the coating thickness is carried out by using a suitable measurement system such as, for example, by measuring the variation of electrostatic capacity between common electrode (FIG. 12.2) and sensor electrode.

In another embodiment of the invention, the flexible film to be decorated and coated with the embossable formulation is applied directly, in single-plank mode, to a finished element such as a floor plank already finished with the interlocking system (FIG. 14). Advantageously, the application of the ready-to-laminate film might be extended to the bevel, avoiding in this way the bevel coloring to uniform its color to the superficial color. The common bevels used in flooring production are micro bevel 10.1, painted bevel 10.2, pressed bevel 10.3. The plank is then embossed mechanically and/or digitally, and the film is trimmed directly during the embossing phase or before or after it. This application method is highly sought after by the market as just-in-time production can be carried out where the planks equipped with the interlocking system but not decorated are finished by applying the flexible substrate produced with the method of the invention. Preferably the film could be adhesive on the non-decorated side and applied by means of heat and/or pressure. The embossing, if not already present in the decorative film object of the invention, could be generated simultaneously with the lamination phase or after it. Advantageously for the single-plank application, lamination might occur using an adhesive which allows lower laminating temperature, thus reducing the risk of deformation of the planks of material to be decorated. The adhesive can be applied on the unprinted face of the decorated film or alternatively on the material to be decorated before applying the decorated film object of the invention. After application, the excess film is trimmed thus obtaining the decorated and embossed plank. According to an embodiment which can be provided alternatively or in combination to one or more of the other embodiments as far it is not technically in contradiction, the single-plank might be achieved by applying the ready-to-laminate film to the single plank cut to size but without the locking system and subsequently the plank would be profiled to generate the locking system. As state-of-the-art the bevel might be painted to uniform the color to the decoration.

According to an embodiment which can be provided alternatively or in combination to one or more of the other embodiments as far it is not technically in contradiction, the ready-to-laminate film object of the invention might be used to decorate planks with pressed bevel (FIG. 10.2). The pressed bevel technology enhances the appearance of resilient flooring to be even closer to real wood than ever before. With this technology, the edges of a resilient flooring panel are pressed downwards into a bevel, making sure the decor layer and texture of the board continue until the deepest point of the bevel. To create the pressed bevel, the SPC boards (PVC core+decorated film+PVC wear layer+topcoat) are pressed with a specific press plate. Because of the tension between all layers and the non-thermoplastic behavior of the photo-crosslinkable topcoat, often during pressing, cracks are formed in the various layers.

In addition to the use to produce architectural materials, the method and formulation object of the invention in any of the embodiments described above can also be used for the decoration of leather and derivatives and for the embellishment in paper converting and cards or for packaging.

In addition, the method and the embossable formulation object of the invention in any of the embodiments described above can be used to produce functional microstructures such as for example hydrophobic structures, microchannels and in general for microfluidics.

The following embodiments are provided for the sole purpose of illustrating the present invention and must not be understood as limiting the scope of protection defined by the attached claims.

Example 1

Creation of PVC ready-to-laminate film, lamination of the film onto the PVC core, mechanical embossing and application of the finish.

General Data:

- NBM360D singlepass inkjet printer (formerly ZEEfarm IT) equipped with a central drum with the following characteristics:
  - central drum (1200 mm) on which the following operations are carried out:
    - application of photo-crosslinkable primer by means of slot-die;
    - primer polymerization by means of LED395+365;
    - 5 colors (CRYKLk) inkjet printing;
    - LED pinning after each color;
    - print curing by means of LED395;
    - application of the photocurable wear layer by means of slot-die;
    - polymerization of the photo-crosslinkable wear layer by means of LED395+365
- Film width 360 mm
- Line speed 30 m/min.
- Central drum thermoregulated at 30° C.
- a printing primer consisting of:
- Acrylate monomer, HDDA: 83.9%
- Radicalicic photoinitiator, Photomer 1173: 5%
- Radicalicic photoinitiator, Photomer TPO-L: 1%
- Wetting additive, Tego glide 432: 0.1%
- Thermoplastic resin, DEGALAN P24: 10%

The primer was dried with a LED395 lamp (1386 mJ/cm2).

Subsequently the film was inkjet printed in (ZEEtree DéCOR series UV inkjet inks: Cyan, Red, Yellow, Black, Grey). After each color the ink was gelled to control the droplet expansion by means of a LED pinning lamp (maximum power 2 w/cm2). Subsequently, the image was polymerized by means of 395 nm LEDs (1386 mJ/cm2).

Subsequently, 150 g/m2 of embossable formulation composed as follows (in parts) were applied by means of slot-die:

- Acrylate monomer, DPGDA: 45
- Urethanacrylate oligomer with Mw 2000 and functionality 3:20
- Radicalic photoinitiator, Photomer 1173:5
- Radicalic photoinitiator, Photomer TPO-L: 1
- Wetting additive, Tego glide 432: 0.1
- Thermoplastic resin, DEGALAN P24: 10
- Aluminum oxide F230: 20

The formulation was then polymerized by irradiation with LED 365 (782 mJ/cm$^2$)+LED 395 nm (1386 mJ/cm$^2$).

It should be noted that the polymerization of coatings and inks was carried out only by LED irradiation at 365 and/or 395 depending on the product.

After the various applications, the decorated and coated film is flexible and can be rewound without being damaged on a 3" core.

Subsequently, the industrial process of extrusion and lamination of SPC was simulated in the laboratory:

- The 200×200×4.5 mm PVC core (ex SENTAI CN) was heated to 150° C. in a manual press.
- Then the printed and coated film was applied to the core at 150° C. and everything was pressed in the same manual press for 60" at 150° C., placing a film of silicone (1 mm) between the core/film and the press plate.
- At the end of the process the surface temperature of the film was 150° C.
- The core was then mechanically embossed (HiWin CN embosser). The embossing cylinder had a wood grain with a maximum depth of 120μ).
- speed 4 m/min,
- Temperature of the embossing cylinder 140° C.

The core laminated with the decorative film was then irradiated with an Hg lamp (220 mJ/cm$^2$). Subsequently, 10 g/m2 of finishing coating composed as follows (in parts) were applied by means of a roller coater machine:

- Acrylate monomer, DPGDA: 65
- Urethanacrylate oligomer with Mw 3500 and functionality 8:15
- Radicalic Photoinitiator, Photomer 184: 5
- Radicalic photoinitiator, Photomer TPO-L: 1
- Wetting additive, Tego glide 432: 0.1
- Silica SYLOID 162C: 15

The formulation was then polymerized by irradiation with Hg lamps (840 mJ/cm$^2$).

The decorated core appears embossed and once cooled and was tested as follows:

| TEST | NORM | VALUE |
|---|---|---|
| Abrasion | EN 13329 | AC5 |
| Resistance to micro scratches method B | | B2 |
| Curling | ISO 23999 | 0.6 mm |
| Texture depth | | Max 120 μ |

Example 2

Creation of PVC film ready-to-laminate film, lamination of the same on the PVC core, release (creation) of the digital texture and application of the protective finish (topcoat).

General Data:

- NBM360D singlepass inkjet printer (formerly ZEEfarm IT) equipped with a double central drum with the following characteristics:
  - first central drum (1200 mm) on which the following operations are carried out:
    - application of photo-crosslinkable primer by means of slot-die;
    - primer polymerization by means of LED395+365;
    - 5 colors (CRYKLk) inkjet printing;
    - LED pinning after each color;
    - color polymerization by means of LED395 (1386 mJ/cm2);
    - application of the matt wear layer by means of slot-die;

second central drum (1200 mm) on which the following operations are carried out:

application of the photo-crosslinkable wear layer to be texturized by means of slot-die;

application of digital texturing fluid by means of inkjet;

polymerization of the photo-crosslinkable wear layer by means of LED395+365;

application of digital protective Photo-crosslinkable varnish by means of slot-die;

Film width 360 mm

Line speed 30 m/min.

Central drum thermoregulated at 30° C.

6 g/m2 of a printing primer consisting (in parts) was applied via slot-die to a 50μ PVC white film (Mondorevine):

Acrylate monomer, HDDA: 85

Radicalic photoinitiator, Photomer 1173:5

Radicalic photoinitiator, Photomer TPO-L: 1

Wetting additive, Tego glide 432: 0.1

Thermoplastic resin, VINNOL H 30/48M: 10

The primer was dried with a 395 nm LED lamp (1386 $mJ/cm^2$)

The film was then inkjet printed (ZEEtree DéCOR series UV inkjet inks: Cyan, Red, Yellow, Black, Grey). After each color the ink was gelled by means of a pinning LED lamp (maximum power 2 w/cm2) to control the droplet expansion. Subsequently, the image representing a medium oak wood was polymerized by means of 395 nm LEDs (1386 $mJ/cm^2$). Subsequently, 30 g/m2 of opaque wear layer formulated as follows (in parts) were applied by means of slot-die:

Acrylate monomer, DPGDA: 45

Urethanacrylate oligomer with Mw 2000 and functionality 3:20

Radicalic photoinitiator, Photomer 1173:5

Radicalic photoinitiator, Photomer TPO-L: 1

Wetting additive, Tego glide 432: 0.1

Thermoplastic resin, VINNOL H 30/48M: 10

Silica: 10

Aluminum oxide F320: 10

The formulation was then polymerized by irradiation with LED 365 (782 $mJ/cm^2$)+LED 395 nm (1386 $mJ/cm^2$).

The wear layer to be digitally embossed was then applied to the second central drum as follows:

Acrylate monomer, DPGDA: 45

Urethanacrylate oligomer with Mw 2000 and functionality 3:20

Radicalic photoinitiator, Photomer 1173:5

Radicalic photoinitiator, Photomer TPO-L: 1

Wetting additive, Tego glide 432: 0.1

Thermoplastic resin, VINNOL H 30/48M: 10

Aluminum oxide F220: 20

The following digital texturing fluid was then applied (in parts):

Acrylate monomer, DPGDA: 95

Tinuvin 400:5

Finally, the protective coating formulated as follows (in parts) was applied by means of slot-die:

Acrylate monomer, DPGDA: 75

Acrylate monomer, dipentaerythrol pentacrylate: 20

Radicalic photoinitiator, Photomer 1173:5

Radicalic photoinitiator, Photomer TPO-L: 1

Wetting additive, Tego glide 432: 0.1

The surface of the film feels dry to the touch and the film is rewound.

Subsequently, the industrial process of extrusion and lamination of SPC was simulated in the laboratory:

The 200×200×4.5 mm PVC core (ex SENTAI CN) was heated to 150° C. in a manual press.

Then the printed and coated film produced previously was applied on the core at 150° C. and everything was pressed in the same manual press for 60" at 150° C., placing a film of silicone (1 mm) between the core/film and the press plate.

At the end of the process the surface temperature of the film is 150° C.

The core was then mechanically embossed (HiWin CN embosser). The embossing cylinder had a wood grain with a maximum depth of 120μ).

speed 4 m/min,

T embossing cylinder 140° C.

In the next phase, three-dimensionality was released by mechanically removing the areas on which the digital texturing fluid had been printed.

The core on which the decorative film was applied was brushed with a QUICKWOOD CDI/300 brushing machine equipped with 3 groups of steel brushes with 0.3 mm diameter wire.

After brushing the three-dimensional structure generated on the decorated core is well defined and detailed.

The core laminated with the decorative film was then irradiated with an Hg lamp Subsequently, 10 g/m2 of finishing coating composed as follows (in parts) was applied by means of slot-die:

Acrylate monomer, DPGDA: 65

Urethanacrylate oligomer with Mw 3500 and functionality 8:15

Radicalic Photoinitiator, Photomer 184: 5

Radicalic photoinitiator, Photomer TPO-L: 1

Wetting additive, Tego glide 432: 0.1

Silica SYLOID 162C: 15

The formulation was then polymerized by irradiation with LED 365 (782 $mJ/cm^2$)+LED 395 nm (1386 $mJ/cm^2$).

It should be noted that the polymerization of coatings and inks was carried out only by LED irradiation at 365 and/or 395 depending on the product.

The digitally decorated and textured core was tested as follows:

| TEST | NORM | VALUE |
|---|---|---|
| Abrasion | EN 13329 | AC5 |
| Resistance to micro scratches method B | | B2 |
| Curling | ISO 23999 | 0.6 mm |
| Texture depth | | Max 120 μ |

Example 3

Creation of a ready-to-laminate PVC film, lamination of the film onto the PVC core and mechanical embossing. The topcoat undergoes a dual-cure type cross-linking reaction.

General Data:

NBM360D singlepass inkjet printer (formerly ZEEfarm IT) equipped with a central drum with the following characteristics:

central drum (1200 mm) on which the following operations are carried out:

application of photo-crosslinkable primer by means of slot-die;

primer polymerization by means of LED395+365;

5 colors (CRYKLk) inkjet printing;

LED pinning after each color;

color polymerization by means of LED395;

application of the photocurable wear layer by means of slot-die;

polymerization of the photo-crosslinkable wear layer by means of LED395+365 application of the Photo-crosslinkable finishing layer (topcoat) by means of slot-die;

polymerization of the photo-crosslinkable finishing layer by means of LED395+365

Film width 360 mm

Line speed 30 m/min.

Central drum thermoregulated at 30° C.

6 g/m2 of a printing primer made up as follows (in parts) was applied via slot-die to a 50μ PVC white film (Mondorevine):

Acrylate monomer, HDDA: 85

Radicalic photoinitiator, Photomer 1173:5

Radicalic photoinitiator, Photomer TPO-L: 1

Wetting additive, Tego glide 432: 0.1

Thermoplastic resin, NEOCRYL B-842: 10

The primer was dried with a LED395 nm lamp (1386 mJ/cm$^2$)

Subsequently the film was inkjet printed (ZEEtree DéCOR series UV inkjet inks: Cyan, Red, Yellow, Black, Grey). After each color the ink was gelled to control the droplet expansion by means of a LED pinning lamp (maximum power 2 w/cm$^2$). Subsequently, the image representing medium oak wood was polymerized by means of 395 nm LEDs (1386 mJ/cm$^2$) Subsequently, 150 g/m2 of embossable formulation composed as follows (in parts) were applied by means of slot-die:

Acrylate monomer, DPGDA: 45

Urethanacrylate oligomer with Mw 2000 and functionality 3:20

Radicalic photoinitiator, Photomer 1173:5

Radicalic photoinitiator, Photomer TPO-L: 1

Wetting additive, Tego glide 432: 0.1

Thermoplastic resin, NEOCRYL B-842: 10

Aluminum oxide F230: 20

The formulation was then polymerized by irradiation with LED 365 (782 mJ/cm$^2$)+LED 395 nm (1386 mJ/cm$^2$).

Subsequently, 10 g/m$^2$ of finishing coating composed as follows (in parts) was applied by means of a slot-die:

Acrylate monomer, DPGDA: 55

Acrylate oligomer containing —OH groups with Mw 15

Acrylate oligomer containing —CNO 15 groups

Radicalic Photoinitiator, Photomer 184: 5

Radicalic photoinitiator, Photomer TPO-L: 1

Wetting additive, Tego glide 432: 0.1

Silica SYLOID 162C: 15

The formulation was then polymerized by irradiation with LED 365 (782 mJ/cm$^2$)+LED 395 nm (1386 mJ/cm$^2$).

It should be noted that the polymerization of coatings and inks was carried out only by LED irradiation at 365 and/or 395 depending on the product.

After the various applications, the decorated and coated film was flexible and could be rewound without being damaged on a 3" core.

Subsequently, the industrial process of extrusion and lamination of SPC was simulated in the laboratory:

The 200×200×4.5 mm PVC core (ex SENTAI CN) was heated to 150° C. in a manual press.

Then the printed and coated film was applied to the core at 150° C. and everything was pressed in the same manual press for 60" at 150° C., placing a film of silicone (1 mm) between the core/film and the press plate.

At the end of the process the surface temperature of the film is 150° C.

The core was then mechanically embossed (HiWin CN embosser). The embossing cylinder had a woodgrain with a maximum depth of 120μ).

speed 4 m/min,

T embossing cylinder 140° C.

The core laminated with the decorative film was then irradiated with an Hg lamp (840 mJ/cm2) The decorated core appears embossed and once cooled and was tested as follows:

| TEST | NORM | VALUE |
|---|---|---|
| Abrasion | EN 13329 | AC5 |
| Resistance to micro scratches method B | | B2 |
| Curling | ISO 23999 | 0.6 mm |
| Texture depth | | Max 120 μ |

Example 4

Pre-adhesive BOPP ready-to-laminate film, lamination of the film on the already finished PP plank with the interlocking system (UNILIN UNICLICK) and simultaneous mechanical embossing. The topcoat undergoes a dual-cure type cross-linking reaction.

General Data:

NBM360D singlepass inkjet printer (formerly ZEEfarm IT) equipped with a central drum with the following characteristics:

central drum (1200 mm) on which the following operations are carried out:

application of photo-crosslinkable primer by means of slot-die;

primer polymerization by means of LED395+365;

5 colors inkjet printing (CRYKLk);

LED pinning after each color;

color polymerization by means of LED395;

application of the photocurable wear layer by means of slot-die;

polymerization of the photo-crosslinkable wear layer by means of LED395+365;

application of the Photo-crosslinkable finishing layer (topcoat) by means of slot-die;

polymerization of the photo-crosslinkable finishing layer by means of LED395+365

Film width 360 mm

Line speed 30 m/min.

Central drum thermoregulated at 30° C.

6 g/m2 of a printing primer made up as follows (in parts) was applied via slot-die to a BOPP white film pre-adhesive with 52μ hotmelt adhesive (SynDECOR ex Taghleef):

Acrylate monomer, HDDA: 85

Radicalic photoinitiator, Photomer 1173:5

Radicalic photoinitiator, Photomer TPO-L: 1

Wetting additive, Tego glide 432: 0.1

Thermoplastic resin, NEOCRYL B-842: 10

The primer was dried with a LED395 nm lamp (1386 mJ/cm$^2$)

Subsequently the film was inkjet printed (ZEEtree DéCOR series UV inkjet inks: Cyan, Red, Yellow, Black, Grey). After each color the ink was gelled to control the droplet expansion by means of a LED pinning lamp (maximum power 2 w/cm$^2$). Subsequently, the image representing medium oak wood was polymerized by means of 395 nm LEDs (1386 mJ/cm$^2$) Subsequently, 150 g/m2 of embossable formulation composed as follows (in parts) were applied by means of slot-die:

Acrylate monomer, DPGDA: 45%

Urethanacrylate oligomer with Mw 2000 and functionality 3:20

Radicalic photoinitiator, Photomer 1173:5

Radicalic photoinitiator, Photomer TPO-L: 1

Wetting additive, Tego glide 432: 0.1

Thermoplastic resin, DEGALAN P24: 10

Aluminum oxide F230: 20

The formulation was then polymerized by irradiation with LED 365 (782 mJ/cm$^2$)+LED 395 nm (1386 mJ/cm$^2$).

Subsequently, 10 g/m$^2$ of finishing coating composed as follows (in parts) was applied by means of slot-die:

Acrylate monomer, DPGDA: 55

Acrylate oligomer containing —OH groups with Mw 15

Acrylate oligomer containing —CNO 15 groups

Radicalic Photoinitiator, Photomer 184: 5

Radicalic photoinitiator, Photomer TPO-L: 1

Wetting additive, Tego glide 432: 0.1

Silica SYLOID 162C: 15

The formulation was then polymerized by irradiation with LED 365 (782 mJ/cm$^2$)+LED 395 nm (1386 mJ/cm$^2$).

It should be noted that the polymerization of coatings and inks was carried out only by LED irradiation at 365 and/or 395 depending on the product.

After the various applications, the decorated and coated film is flexible and can be rewound without being damaged on a 3" core.

Subsequently, the film ready-to-laminate was in-line applied and embossed to a PP board (200×600×5 mm ex POLYCO CA) already finished with the interlocking element (locking):

The PP core was heated to 50° C. by means of infrared lamp.

Then the film ready-to-laminate was applied to the core by means of a heated calender:

Calender diameter 300 mm

Calender temperature 150° C.

Speed 15 m/min

The laminated core was then mechanically embossed (HiWin CN embosser) with the following conditions:

Embossing cylinder temperature 150° C.

Speed 15 m/min

Embossing cylinder had a wood grain with a maximum depth of 120μ).

After application the film is firmly laminated to the core and the bevel and embossed; the interlocking system is not damaged. The excess film was then trimmed manually with a specific tool.

The laminated and embossed core with the film ready-to-laminate was then irradiated with an Hg lamp (840 mJ/cm2).

The decorated and embossed core, once cooled, was tested as follows:

| TEST | NORM | VALUE |
|---|---|---|
| Abrasion | EN 13329 | AC5 |
| Resistance to micro scratches method B | | B2 |
| Curling | ISO 23999 | 0.6 mm |
| Texture depth | | Max 120 μ |

Example 5

Use of Pre-adhesive BOPP ready-to-laminate film, in-line lamination of the film on a PP plank, mechanical embossing, profiling to create the locking system.

The pre-adhesive BOPP was printed and coated as described in EXAMPLE 4, subsequently the film ready-to-laminate was in-line applied and embossed to a profiled (UNILIN UNICLIC) PP board (200×600×5 mm ex POLYCO CA):

The PP core was heated to 50° C. by means of infrared lamp.

Then the film ready-to-laminate was applied to the core by means of a heated calender:

Calender diameter 300 mm

Calender temperature 150° C.

Speed 15 m/min

The laminated core was then mechanically embossed (HiWin CN embosser) with the following conditions:

Embossing cylinder temperature 150° C.

Speed 15 m/min

Embossing cylinder had a wood grain with a maximum depth of 120μ).

After application the film is firmly laminated to the core and embossed.

The laminated and embossed core with the film ready-to-laminate was then irradiated with an Hg lamp (840 mJ/cm2).

The plank was then profiled (HOMAG) to create the locking system.

The decorated and embossed core, once cooled, was tested as follows:

| TEST | NORM | VALUE |
|---|---|---|
| Abrasion | EN 13329 | AC5 |
| Resistance to micro scratches method B | | B2 |
| Curling | ISO 23999 | 0.6 mm |
| Texture depth | | Max 120 μ |

Example 6

Use of Pre-adhesive BOPP ready-to-laminate film, solid color application, in-line lamination of the film on a PP plank, mechanical embossing.

General Data:

NBM360D singlepass inkjet printer (formerly ZEEfarm IT) equipped with a central drum with the following characteristics:

central drum (1200 mm) on which the following operations are carried out:

application of solid color by means of slot-die;

solid color polymerization by means of LED395+365;

application of the photocurable embossing formulation by means of slot-die;

polymerization of the photo-crosslinkable slot-die by means of LED395+365;

Film width 360 mm

Line speed 30 m/min.

Central drum thermoregulated at 30° C.

The film was coated with the following composition:

Y: 10 parts

R: 10 parts

K: 5 parts

The inks were in-line mixed with a Sulzer static mixer and applied with a slot-die (v-shaped manifold, 20 microns shim). Varying the slot-die distance to the substrate, 6 and 12 microns were applied and cured with LED 365/395 lamp. Subsequently, 120 g of the embossable formulation (same as Example 4) was applied by means of a slot-die (v-shaped manifold, 150 microns shim) and cured with LED 365/395 lamp. Afterwards, the PP core was heated to 50° C. by means of infrared lamp.

Then the film ready-to-laminate was applied to the core by means of a heated calender:

Calender diameter 300 mm

Calender temperature 150° C.

Speed 15 m/min

The laminated core was then mechanically embossed (HiWin CN embosser) with the following conditions:

Embossing cylinder temperature 150° C.

Speed 15 m/min

Embossing cylinder had a wood grain with a maximum depth of 120μ).

After application the film is firmly laminated to the core.

The color is brown with the following Lab values D65, 10°):

White film: L 98.03, a −0.76 b 0.66

Brown (12μ) L 28.85, a 20.92 b 19.63

Light B brown (6μ) L 59.10, a 12.51 b 27.75

Example 7

In this example will be shown the effect of thermoplastic resin and dual cure system compared to the base formulation.

Sample 1: Base Formulation

| Component | TYPE | Tg | Amount |
|---|---|---|---|
| DPGDA | ACRYLATE RESIN | 104 | 90 |
| 1173 | PHOTOINITIATOR | | 5 |
| TPO | PHOTOINITIATOR | | 0.2 |
| PETIA | —OH FUNCTIONAL RESIN | 103 | 10 |
| TEGO GLIDE 432 | SUBSTRATE WETTING AGENT | | 0.2 |

Sample 2: Formulation with Thermoplastic Resin

| Component | TYPE | Tg | Amount |
|---|---|---|---|
| DPGDA | ACRYLATE RESIN | 104 | 90 |
| LG BA410 | ACRYLIC RESIN | 80 | 10 |
| 1173 | PHOTOINITIATOR | | 5 |
| TPO | PHOTOINITIATOR | | 0.2 |
| PETIA | —OH FUNCTIONAL RESIN | 103 | 10 |
| TEGO GLIDE 432 | SUBSTRATE WETTING AGENT | | 0.2 |

Sample 2: Formulation with Thermoplastic Resin and DUAL-CURE Mechanism.

| Component | TYPE | Tg | Amount |
|---|---|---|---|
| DPGDA | ACRYLATE RESIN | 104 | 90 |
| LG BA410 | ACRYLIC RESIN | 80 | 10 |
| 1173 | PHOTOINITIATOR | | 5 |
| TPO | PHOTOINITIATOR | | 0.2 |
| PETIA | —OH FUNCTIONAL RESIN | 103 | 10 |
| LAROMER 9000 | —CNO FUNCTIONAL OLIGOMER | | 10 |
| TEGO GLIDE 432 | SUBSTRATE WETTING AGENT | | 0.2 |

The formulations have been prepared in the laboratory by means of a high-speed mixer for 30'. Afterwards each formulation has been applied on a 70μ white PVC film (ex Mondorevine) using a drawdawn bar and cured with a LED365/395 lam. The thickness has been measured with a micrometer.

Afterwards the sample has been laminated and woodgrain embossed onto a SPC core (ex-SENTAI CN), for 30" at 175° C.

Afterwards the sample has been cooled down to RT.

Reference peaks have been selected on the three samples and measured with a micrometer. Afterwards the samples have been placed in the oven at 80° C. for 24 h. The reference peaks have been measured again.

Another set of samples has been placed in the oven at 90° C. for 24 h.

The reference peaks have been measured again.

Another set of samples has been tested for curling.

The results are reported in the table.

| FORMULATION | Tg (DMA) | TEXTURE LOSS at 80C | TEXTURE LOSS at 90C | CURLING ISO 23999 |
|---|---|---|---|---|
| 1 | 88 | 40% | 90% | 2.3 mm |
| 2 | 85 | 2% | 15% | O, 6 mm |
| 3 | 95 | 2% | 8% | O, 7 mm |

The effect of the thermoplastic resin, alone as well as in combination with the dual-cure system it's clear with overall properties improvement.

The invention claimed is:

1. A process for decorating a material comprising the steps of:

(a) printing an image or a uniform color on at least part of a flexible film;

(b) curing or drying the ink;

(c) applying an embossable formulation consisting of a photo-crosslinkable formulation containing at least one thermoplastic resin to at least a portion of the printed flexible film, wherein said embossable formulation is applied in an amount of 50 to 250 g/m$^2$;

(d) substantially polymerizing said embossable formulation by photo-crosslinking;

(e) laminating the decorated and coated film with the embossable formulation onto at least part of a substrate to be decorated using heat and/or pressure; and (f) mechanically embossing the embossable formulation and/or the combination of said substrate and said film laminated thereon by applying heat to said embossable formulation, wherein said mechanically embossing step (f) is performed after or simultaneously with said laminating step (e), and wherein said thermoplastic resin imparts thermoplastic embossability to said substantially polymerized photo-crosslinkable formulation.

2. The process according to claim 1 wherein the flexible film decorated and coated with the embossable formulation and the substrate to be decorated are of the same chemical nature.

3. The process according to claim 1 in which the lamination of the flexible film, decorated and coated with the embossable formulation, with the substrate to be decorated occurs solely by means of heat and/or pressure.

4. The process according to claim 1, wherein the lamination of the flexible film, decorated and coated with the embossable formulation, with the substrate to be decorated occurs with the aid of an adhesive.

5. The process according to claim 1, wherein a surface treatment is performed to the film before printing.

6. The process according to claim 1, wherein the uniform color is generated in-line.

7. The process according to claim 1, wherein one or more of liquid layers selected from primer, ink, embossable formulation, and topcoat are applied to the film and are of photo-crosslinkable nature.

8. The process according to claim 1, wherein one or more liquid layers selected from primer, ink, embossable formulation, and topcoat applied to the film undergo a dual-cure process.

9. The process according to claim 1, wherein the gloss of the embossed combination of said substrate and said film laminated on said substrate is determined by the embossing element.

10. The process according to claim 1, wherein the embossable formulation is applied by a single application step.

11. The process according to claim 1, wherein one or more liquid layers are applied to the film by means of a slot-die.

12. The process according to claim 1, wherein the embossable formulation is digitally textured and/or mechanically embossed.

13. The process according to claim 1, wherein the embossing takes place by means of an embossing element such as a flat press, a calender, a double belt press and a combination thereof.

14. The process according to claim 1, wherein the embossable formulation is digitally embossed by localized printing of a texturing fluid defining an embossing pattern on at least part of the surface thereof.

15. The process according to claim 1, wherein the embossing or texturing is made in registration with the image or the uniform color printed on said at least part of the flexible film.

16. The process according to claim 1, wherein the substrate consists of a finished floor element on which the interlocking system has already been generated or the interlocking system is generated subsequently by lamination of the flexible film coated with the embossable formulation.

17. The process according to claim 1, wherein the flexible film is made of polymers or paper or metal or a combination thereof.

18. The process according to claim 1, wherein the substrate consists of plastic materials selected from PVC, SPC, LVT, WPC, and polyolefins, wood derivatives selected from MDF, HDF, chipboard, and OSB, metal, or inorganic materials and combinations thereof.

19. The process according to claim 1, wherein the substrate to be decorated is in discrete form as a panel or board, or in continuous form as a roll.

20. The process according to claim 1, wherein the printing is of the analogue type selected from rotogravure, flexography, offset, intaglio, or silkscreen, or of the digital type selected from inkjet, toner, or liquid toner, or combinations thereof.

21. A ready-to-laminate film comprising:

(a) a film made of plastic or paper or combinations thereof;

(b) a printed decoration or solid color applied to at least part of the said film; and (c) an embossable formulation consisting of a photo-crosslinkable formulation containing at least one thermoplastic resin applied to at least a portion of said film.

22. The ready-to-laminate film according to claim 21, wherein said film is applied by means of pressure and/or heat to a substrate to be decorated.

23. The ready-to-laminate film according to claim 22, wherein after said film is applied to the substrate, said film is embossed.

24. The ready-to-laminate film according to claim 22, wherein said film is applied and mechanically embossed to the substrate to be decorated simultaneously.

25. The ready-to-laminate film according to claim 22, wherein said film is embossed in a subsequent step after application to the substrate to be decorated.

26. The ready-to-laminate film according to claim 21, wherein a heat-activatable adhesive is applied to at least part of the unprinted side of said film.

27. A printing and coating machine comprising:

an unwinder;

a central impression drum on which there is at least one slot-die station to apply liquid layers and at least one inkjet printing station; and a rewinder.

28. The printing and coating machine according to claim 27, wherein analog and/or digital applications are performed on two or more central impression drums in series.

29. The printing and coating machine according to claim 27, wherein flow of different coatings is machine regulated by a PLC or other logic system where parameters related to a desired specification of a decorated substrate are inputted.

30. A process for decorating a material comprising the steps of:

(a) printing an image or a uniform color on at least part of a flexible film;

(b) curing or drying the ink;

(c) applying an embossable formulation consisting of a photo-crosslinkable formulation containing at least one thermoplastic resin, to at least a portion of the printed flexible film;

(d) substantially polymerizing said embossable formulation by photo-crosslinking;

(e) laminating the decorated and coated film with the embossable formulation onto at least part of a substrate to be decorated solely by means of heat and/or pressure without the use of adhesives, wherein said flexible film and said substrate are of the same chemical nature; and (f) mechanically embossing the embossable formulation and/or the combination of said substrate and said film laminated thereon by applying heat.

31. A process for decorating a material comprising the steps of:

(a) printing an image or a uniform color on at least part of a flexible film;

(b) curing or drying the ink;

(c) applying an embossable formulation consisting of a photo-crosslinkable formulation containing at least one thermoplastic resin, to at least a portion of the printed flexible film;

(d) substantially polymerizing said embossable formulation by photo-crosslinking;

(e) digitally texturing said embossable formulation by localized application of a texturing fluid;

(f) laminating the decorated and coated film with the embossable formulation onto at least part of a substrate to be decorated; and (g) mechanically embossing said embossable formulation using an embossing element selected from a flat press, a calender, a double belt press, and combinations thereof, wherein said embossable formulation is both digitally textured and mechanically embossed.

32. A process for decorating a material comprising the steps of:

(a) printing an image or a uniform color on at least part of a flexible film;

(b) curing or drying the ink;

(c) applying an embossable formulation consisting of a photo-crosslinkable formulation containing at least one thermoplastic resin, to at least a portion of the printed flexible film;

(d) substantially polymerizing said embossable formulation by photo-crosslinking;

(e) laminating the decorated and coated film with the embossable formulation onto a finished floor element selected from a plank, a board, and a finished floor plank on which an interlocking system has already been generated or is generated subsequently to the lamination; and (f) mechanically embossing the embossable formulation and/or the combination of said finished floor element and said film laminated thereon.

* * * * *